(12) United States Patent
Nakano et al.

(10) Patent No.: US 9,416,208 B2
(45) Date of Patent: Aug. 16, 2016

(54) METHOD FOR PRODUCING ETHYLENE-VINYL ALCOHOL COPOLYMER RESIN, ETHYLENE-VINYL ALCOHOL COPOLYMER RESIN, AND LAMINATE

(75) Inventors: Kenji Nakano, Okayama (JP); Kazutaka Ikeda, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 148 days.

(21) Appl. No.: 14/008,669

(22) PCT Filed: Mar. 23, 2012

(86) PCT No.: PCT/JP2012/057649
§ 371 (c)(1),
(2), (4) Date: Sep. 30, 2013

(87) PCT Pub. No.: WO2012/133252
PCT Pub. Date: Oct. 4, 2012

(65) Prior Publication Data
US 2014/0018462 A1 Jan. 16, 2014

Related U.S. Application Data

(63) Continuation of application No. 13/075,783, filed on Mar. 30, 2011, now Pat. No. 8,419,999.

(30) Foreign Application Priority Data

Jan. 23, 2012 (JP) ................. 2012-011312

(51) Int. Cl.
| | |
|---|---|
| *C08F 2/46* | (2006.01) |
| *C08G 61/04* | (2006.01) |
| *C08F 216/06* | (2006.01) |
| *C08J 3/28* | (2006.01) |
| *C08F 6/26* | (2006.01) |
| *C08F 210/02* | (2006.01) |
| *C08F 6/12* | (2006.01) |
| *C08F 2/01* | (2006.01) |
| *B32B 27/08* | (2006.01) |
| *B32B 27/30* | (2006.01) |
| *C08J 7/12* | (2006.01) |
| *C08J 7/14* | (2006.01) |
| *B29C 47/00* | (2006.01) |
| *B29C 47/10* | (2006.01) |

(52) U.S. Cl.
CPC .............. *C08F 216/06* (2013.01); *B32B 27/08* (2013.01); *B32B 27/306* (2013.01); *C08F 2/01* (2013.01); *C08F 6/12* (2013.01); *C08F 6/26* (2013.01); *C08F 210/02* (2013.01); *C08J 3/28* (2013.01); *C08J 7/123* (2013.01); *C08J 7/14* (2013.01); *B29C 47/0009* (2013.01); *B29C 47/1018* (2013.01); *C08J 2329/02* (2013.01); *C08J 2329/04* (2013.01)

(58) Field of Classification Search
CPC ........ C08F 216/06; C08F 210/02; C08F 8/12; C08F 2/01; C08F 6/12; C08F 6/26; B32B 27/08; B32B 27/306; C08J 3/28; C08J 2329/02; B29C 47/1018; B29C 47/04; B29C 47/0009
USPC ............ 522/11, 1, 153, 150, 161, 157; 520/1; 526/202, 201, 89, 72; 528/480; 525/60, 525/56, 55, 50, 165, 232, 191, 317, 242, 525/313
See application file for complete search history.

(56) References Cited

U.S. PATENT DOCUMENTS

| | | | |
|---|---|---|---|
| 6,620,472 B1 | 9/2003 | Shepard et al. | |
| 6,855,432 B1 | 2/2005 | Hojabr et al. | |
| 6,908,668 B2 | 6/2005 | Hanada et al. | |
| 6,929,705 B2 | 8/2005 | Myers et al. | |
| 7,060,346 B2 | 6/2006 | Yagi et al. | |
| 8,419,999 B2 | 4/2013 | Tsuboi et al. | |
| 2004/0082690 A1* | 4/2004 | Kawahara et al. | 524/127 |
| 2005/0113540 A1 | 5/2005 | Weaver et al. | |
| 2009/0149593 A1* | 6/2009 | Funabiki et al. | 524/442 |
| 2009/0274894 A1* | 11/2009 | Yoshida et al. | 428/319.1 |
| 2011/0030891 A1* | 2/2011 | Feng et al. | 156/272.2 |

FOREIGN PATENT DOCUMENTS

| | | |
|---|---|---|
| CN | 1121089 A | 4/1996 |
| CN | 1214741 A | 4/1999 |

(Continued)

OTHER PUBLICATIONS

Extended European Search Report issued Oct. 23, 2014, in Patent Application No. 12764372.4
Office Action mailed Aug. 8, 2012 in co-pending U.S. Appl. No. 13/075,783.
International Search Report issued Jun. 26, 2012 in Application No. PCT/JP2012/057649.

*Primary Examiner* — Ling Choi
*Assistant Examiner* — Jessica E Whiteley
(74) *Attorney, Agent, or Firm* — Oblon, McClelland, Maier & Neustadt, L.L.P.

(57) ABSTRACT

Provided are a method for producing an EVOH resin having sufficient long-run workability in melt molding and enabling prevention of coloring such as yellowing, an EVOH resin obtained by this method for production, and a laminate obtained from this resin. Additionally, a method for producing an ethylene-vinyl alcohol copolymer resin capable of efficiently drying while inhibiting deterioration of qualities is provided. The method for producing an ethylene-vinyl alcohol copolymer resin of the present invention includes a step of irradiation with an infrared ray for irradiating with an infrared ray an ethylene-vinyl alcohol copolymer or an ethylene-vinyl ester copolymer that is a precursor of the ethylene-vinyl alcohol copolymer.

17 Claims, 1 Drawing Sheet

(56) References Cited

FOREIGN PATENT DOCUMENTS

| | | |
|---|---|---|
| CN | 1287051 A | 3/2001 |
| CN | 1962237 A | 5/2007 |
| CN | 101065439 A | 10/2007 |
| EP | 1 816 159 A1 | 8/2007 |
| EP | 2 008 808 A1 | 12/2008 |
| JP | 46-37665 | 11/1971 |
| JP | 50-100194 | 8/1975 |
| JP | 55-150316 | 11/1980 |
| JP | 1-191668 A | 8/1989 |
| JP | 11-291244 | 10/1999 |
| JP | 11-291245 | 10/1999 |

* cited by examiner

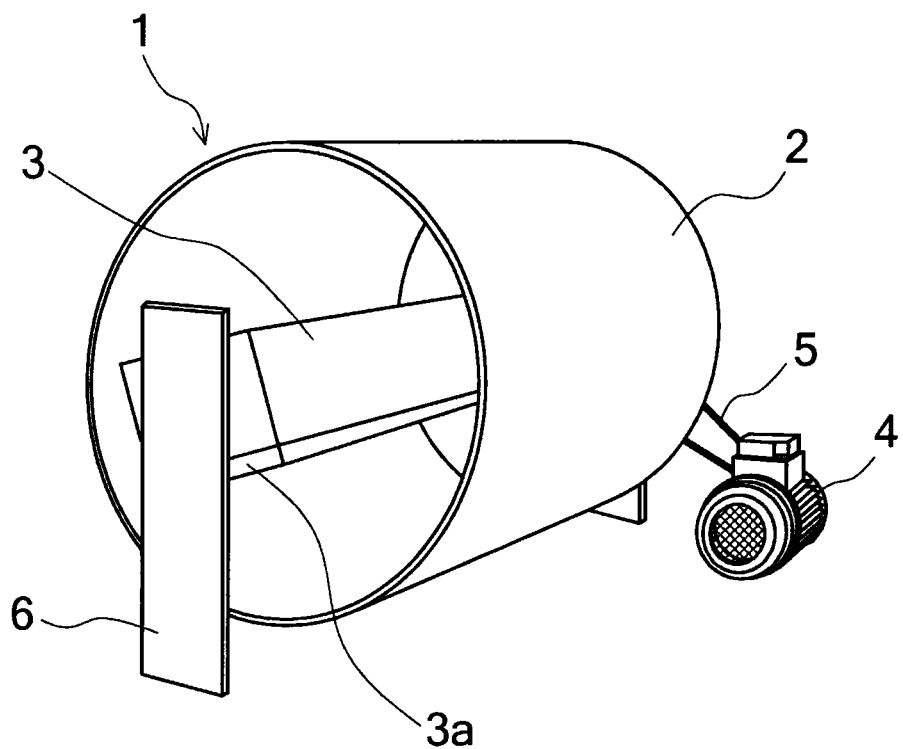
F I G. 1
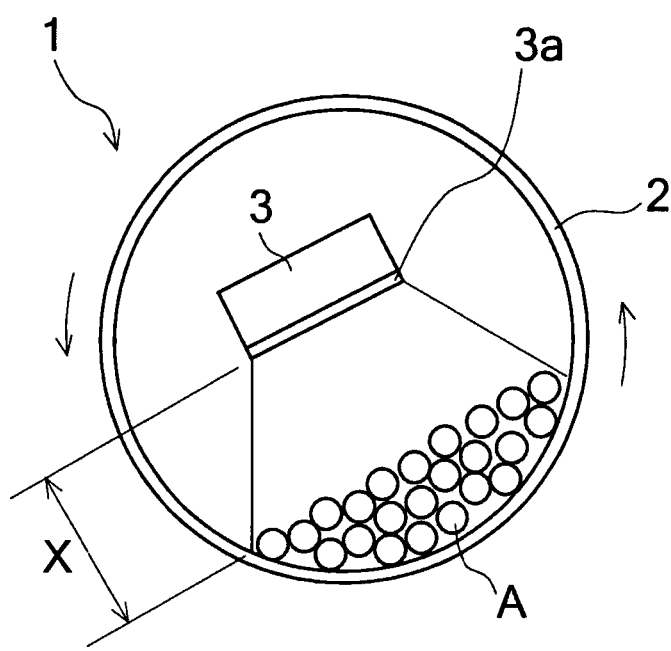
F I G. 2

METHOD FOR PRODUCING ETHYLENE-VINYL ALCOHOL COPOLYMER RESIN, ETHYLENE-VINYL ALCOHOL COPOLYMER RESIN, AND LAMINATE

TECHNICAL FIELD

The present invention relates to a method for producing an ethylene-vinyl alcohol copolymer resin, an ethylene-vinyl alcohol copolymer resin obtained by this method for production, and a laminate having a layer containing this resin.

BACKGROUND ART

Ethylene-vinyl alcohol copolymers (hereinafter, may be abbreviated as "EVOH") are superior in oxygen barrier properties, transparency, oil resistance, antistatic properties, mechanical strength and the like, and thus have been widely used as various types of wrapping material and the like such as films, sheets, containers, etc.

These films and the like are usually formed by a melt molding method. Therefore, EVOH is expected to have superior appearance characteristics in melt molding (being enabling molded articles having superior appearances without generation of gels and seeds (dirt under paint), occurrence of coloring such as yellowing, and the like to be obtained), long-run workability (a property enabling a molded article to be obtained without change of physical properties such as viscosity, etc., and without occurrence of fish-eye, streak, etc., if molded for a long period of time), and the like. In addition, films, sheets and the like are often formed with a multilayered structure having an EVOH layer for the purpose of improving oxygen barrier properties and the like. When such a laminate is to be obtained, a metal salt is often contained in an EVOH resin in order to improve adhesiveness between layers. However, it is known that particularly when a metal salt is included in an EVOH resin, coloring such as yellowing is more likely to be caused, and thus appearance characteristics are deteriorated.

Under such circumstances, in order to improve various characteristics demanded for EVOH, particularly appearance characteristics, a variety of processes such as a process of irradiating EVOH with an ultraviolet ray (see Japanese Unexamined Patent Application, Publication No. S50-100194) and a process of irradiating EVOH with a microwave (see Japanese Unexamined Patent Application, Publication No. H11-291245) were proposed.

However, according to these methods for production, coloring such as yellowing is not sufficiently prevented, and they are further disadvantageous in running costs being high, influences on human bodies being significant, difficulty in adjusting the drying time, and the like. Specifically, for example, when EVOH is irradiated with an ultraviolet ray, energy of the ultraviolet ray is so great that significant negative influences on human bodies may be concerned. Also, when, for example, a microwave is irradiated, deterioration occurs even if irradiated for a short time period of time, and is thus disadvantageous in deteriorated long-run workability.

Also, in general, EVOH resins are obtained by: subjecting an ethylene-vinyl acetate polymer to saponification; granulating EVOH obtained by saponification; and drying the granular matter. In this process, the moisture absorbed into the granular matter may account for molding defects such as occurrence of bubbling during molding processing carried out using the granular matter. Therefore, it is important to decrease a water content of the granular matter by sufficiently drying in producing an EVOH resin.

In general drying methods of granular matters (solid matters) of EVOH, heating gas is used (see Japanese Examined Patent Application, Publication No. S46-037665, Japanese Unexamined Patent Application, Publication No. H11-291244), and a method in which a microwave is used as described above has been also proposed. However, since EVOH has a high affinity to water, drying must be carried out for a long period of time when the heating gas is used. Furthermore, heating at a high temperature for shortening the drying time may account for occurrence of coloring, fish-eyes generated during molding, and the like, thereby leading to deterioration of quality. Although the aforementioned method in which a microwave is used has been proposed for solving such problems, it is not acceptable as an effective means since granular matter particles are likely to agglutinate with one another through fusion, and the like, according to this method.

PRIOR ART DOCUMENTS

Patent Documents

Patent Document 1: Japanese Unexamined Patent Application, Publication No. S50-100194
Patent Document 2: Japanese Unexamined Patent Application, Publication No. H11-291245
Patent Document 3: Japanese Examined Patent Application, Publication No. S46-037665
Patent Document 4: Japanese Unexamined Patent Application, Publication No. H11-291244

SUMMARY OF THE INVENTION

Problems to be Solved by the Invention

The present invention was made in view of the foregoing circumstances, and an object of the invention is to provide a method for producing an EVOH resin having sufficient long-run workability in melt molding and enabling prevention of coloring such as yellowing, an EVOH resin obtained by this method for production, and a laminate obtained from this resin. Additionally, another object of the present invention is to provide a method for producing an ethylene-vinyl alcohol copolymer resin enabling efficient drying while inhibiting deterioration of qualities.

Means for Solving the Problems

The present inventors found that an EVOH resin enabling prevention of coloring such as yellowing can be obtained without deteriorating long-run workability by irradiating an ethylene-vinyl ester copolymer (hereinafter, may be abbreviated as "EVAc") that is a precursor of EVOH, or EVOH with an infrared ray. In addition, it was found that the irradiation with an infrared ray enables solid matters containing an ethylene-vinyl alcohol copolymer and water to be dried within a short period of time, and deterioration of qualities during the drying is less likely to occur. Moreover, the present inventors thoroughly investigated, and consequently the present invention was accomplished.

An aspect of the invention made in order to solve the foregoing problems relates to a method for producing an ethylene-vinyl alcohol copolymer resin, the method comprising:

an step of irradiation with an infrared ray in which an ethylene-vinyl alcohol copolymer or an ethylene-vinyl ester copolymer that is a precursor of the ethylene-vinyl alcohol copolymer is irradiated with an infrared ray.

According to the method for producing an EVOH resin, yellowing of the resulting EVOH resin can be prevented without deteriorating long-run workability by including a step of irradiation with an infrared ray. In addition, according to the method for producing an EVOH resin, by irradiating with an infrared ray on a solid matter containing EVOH and water, drying of the solid matter is enabled within a short period of time while inhibiting deterioration of qualities.

The irradiation with an infrared ray in the step of irradiation with an infrared ray is preferably carried out with an infrared ray lamp. Also, in the step of irradiation with an infrared ray: the wavelength of the infrared ray is preferably 700 nm or greater and 1,000,000 nm or less; the intensity of the infrared ray is preferably $30 \times 10^3$ W/m$^3$ or greater and $3,000 \times 10^3$ W/m$^3$ or less; and the irradiation time of the infrared ray is preferably 0.1 hours or longer and 20 hours or shorter. When the wavelength, the intensity and irradiation time of the infrared ray fall within the above range, yellowing, etc., of EVOH can be further prevented, and also efficiency of drying can be enhanced. In addition, when irradiation is carried out with an infrared ray lamp, the conditions and the like can be readily adjusted.

It is preferred that the method further includes the step of saponifying the ethylene-vinyl ester copolymer to obtain an ethylene-vinyl alcohol copolymer.

When the step of irradiation with an infrared ray is carried out not before the saponification step, the temperature of the ethylene-vinyl alcohol copolymer resin in this step of irradiation with an infrared ray is preferably the glass transition temperature or greater and the melting temperature or less of the ethylene-vinyl alcohol copolymer. Yellowing can be further prevented by irradiating the EVOH resin with an infrared ray at a temperature within this range.

When the step of irradiation with an infrared ray is carried out prior to the saponification step, the temperature of the ethylene-vinyl ester copolymer resin in this step of irradiation with an infrared ray is preferably 40° C. or greater and 110° C. or less. The yellowing can be further prevented by irradiating the EVAc resin with an infrared ray at a temperature within this range.

Provided that the method for production further has a pelletization step of obtaining a pellet including an ethylene-vinyl alcohol copolymer from a solution or paste containing the ethylene-vinyl alcohol copolymer obtained by the saponification step, the step of irradiation with an infrared ray is preferably carried out simultaneously with or after the pelletization step.

When the irradiation with an infrared ray is carried out prior to the drying step, the water content of the pellet before irradiating with an infrared ray is preferably 10% by mass or greater and 200% by mass or less.

Provided that the method for production further has a drying step of drying the pellet to give a water content of 0.01% by mass or greater and less than 10% by mass, the step of irradiation with an infrared ray is preferably carried out simultaneously with or after the drying step.

Provided that the method for production further has a molding step of molding the pellet to obtain a molded product including an ethylene-vinyl alcohol copolymer, it is also preferred that the step of irradiation with an infrared ray is carried out simultaneously with or after the molding step.

Provided that the irradiation with an infrared ray is carried out not before the drying step, the pellet or the molded product preferably has a water content before irradiating with an infrared ray of 0.01% by mass or greater and less than 10% by mass.

When the step of irradiation with an infrared ray is carried out not before the saponification step, the yellowing of the resulting EVOH resin can be further prevented by irradiation with an infrared ray that is carried out under the aforementioned each condition.

The irradiation with an infrared ray is preferably carried out on solid matters containing an ethylene-vinyl alcohol copolymer and water. Furthermore, it is preferred that the solid matter is dried by the irradiation with an infrared ray. Thus drying by the irradiation with an infrared ray enables the solid matter containing EVOH to be efficiently dried even at a low atmospheric temperature and within a short drying time period. The drying time period which can be shortened allows for the size reduction of a facility required for achieving a processing capacity equivalent to that in conventional technologies, thereby leading to an advantage such as a reduction in cost for establishment of the facility. In addition, according to this aspect, an EVOH resin sufficiently dried and accompanied by less deterioration of qualities can be obtained.

When the solid matter is dried by the irradiation with an infrared ray, the atmospheric temperature in the step of irradiation with an infrared ray is preferably 10° C. or greater and 100° C. or less. By drying at an atmospheric temperature falling within the above range, efficiency of drying can be enhanced, and deterioration of qualities of the resulting resin can be further inhibited.

When the solid matter is dried by the irradiation with an infrared ray, the temperature of the solid matter in the step of irradiation with an infrared ray is preferably 80° C. or greater and 160° C. or less. By drying with a temperature of the solid matter falling within the above range, efficiency of drying can be enhanced, and deterioration of qualities of the resulting resin can be further inhibited.

When the solid matter is dried by the irradiation with an infrared ray, the water content of the solid matter subjected to the step of irradiation with an infrared ray is preferably 0.5% by mass or greater and 200% by mass or less. According to the method for production, the solid matter having a water content falling within the above range can be efficiently dried.

When the solid matter is dried by the irradiation with an infrared ray, the water content of the solid matter after subjecting to the step of irradiation with an infrared ray is preferably less than 0.5% by mass. When the solid matter is dried to have the water content falling within the above range in the method for production, formability and the like of the obtained resin can be improved.

When the irradiation with an infrared ray is carried out on the solid matter, the solid matter is preferably granular. By carrying out the irradiation with an infrared ray on the granular solid matter (granular matter), efficiency of irradiation (efficiency of drying) and the like can be further enhanced.

When the irradiation with an infrared ray is carried out on the solid matter, it is preferred that the granular solid matter is irradiated with the infrared ray while agitating in the step of irradiation with an infrared ray. By thus irradiating the granular solid matter with an infrared ray while agitating, the solid matter can be uniformly irradiated, whereby efficiency of drying can be enhanced, and deterioration of qualities can be inhibited.

When the irradiation with an infrared ray is carried out on the solid matter, it is also preferred that in the step of irradiation with an infrared ray, the infrared ray is irradiated while conveying the granular solid matter on a conveyor. When the granular solid matter is irradiated with an infrared ray while conveying on a conveyor in this manner, adjustment of the irradiation dose and the like can be facilitated, and production efficiency of the resin can be also improved.

The ethylene-vinyl alcohol copolymer resin of the present invention is a resin obtained by the method for producing an ethylene-vinyl alcohol copolymer resin.

The ethylene-vinyl alcohol copolymer has an ethylene content of preferably 20 mol % or greater and 60 mol % or less, and a degree of saponification of preferably 90 mol % or greater.

The ethylene-vinyl alcohol copolymer resin preferably has a pellet form or film form.

The laminate of the present invention is a laminate having at least one layer containing the ethylene-vinyl alcohol copolymer resin.

Herein, the term "ethylene-vinyl alcohol copolymer (EVOH) resin" means a resin containing EVOH as a principal component, and this resin may contain other component. The principal component as referred to herein means a component included in the greatest amount on a mass basis. Further, the form of this resin is not particularly limited, and may include, for example, a solid form, a liquid form, a solution form, and the like. When the resin has a solid form, the shape is not particularly limited, and the resin may be molded to give a granular form, film form, fiber form, or other specific form.

Effects of the Invention

As explained in the foregoing, according to the method for producing an EVOH resin of the present invention, an EVOH resin that is superior in appearance characteristics of having sufficient long-run workability in melt molding, and enabling prevention of coloring such as yellowing can be obtained. In addition, according to the method for producing an EVOH resin of the present invention, efficient drying is enabled while inhibiting deterioration of qualities. Furthermore, according to the resin obtained by the method for production, various types of molded products such as pellets, monolayer or multilayer films, sheets, pipes, vessels and fibers that are superior in appearance characteristics can be obtained while enabling prevention of yellowing.

BRIEF DESCRIPTION OF THE DRAWINGS

FIG. 1 shows a schematic perspective view illustrating a drying device used in one embodiment of the present invention; and FIG. 2 shows a schematic cross sectional view illustrating the drying device shown in FIG. 1.

DESCRIPTION OF EMBODIMENTS

Hereinafter, preferred embodiments for carrying out the present invention are explained in detail.

The method for producing an EVOH resin of the present invention includes an step of irradiation with an infrared ray in which an ethylene-vinyl alcohol copolymer (EVOH) or an ethylene-vinyl ester copolymer (EVAc) that is a precursor of the EVOH is irradiated with the infrared ray.

<Infrared Ray>

In the method for production of the present invention, due to having a step of irradiation of EVAc or EVOH with an infrared ray for irradiating with an infrared ray in a production step of an EVOH resin as described above, coloring such as yellowing of the resulting EVOH resin is prevented, and an EVOH resin having further sufficient long-run workability in melt molding can be obtained. Although the mechanism of achieving such effects has not been necessarily known, for example, the following mechanism may be envisaged. Irradiation with an infrared ray activates movement of molecular chains, and thus polyene compounds (particularly polyene compounds having 4 to 8 carbon atoms) that are presumed to be the cause of coloring being present in the resin are volatilized. Accordingly, coloring such as yellowing is prevented, and still further generation of fine seeds (dirt under paint) can be suppressed even in melt molding at a comparatively high temperature. Moreover, according to the method for producing an EVOH resin, the irradiation with an infrared ray carried out on the solid matter containing EVOH and water enables the solid matter to be dried within a short period of time while inhibiting deterioration of qualities.

The radiation source of the infrared ray is not particularly limited, and an infrared ray lamp in which any of various types of filament such as nichrome, tungsten or carbon is used, as well as any of various types of infrared ray lasers such as a carbon dioxide gas laser and an YAG laser, or the like may be used. Of these, an infrared ray lamp is preferably used in light of ease in handling and the like.

The wavelength of the infrared ray irradiated is preferably 700 nm or greater and 1,000,000 nm or less. When the wavelength of the infrared ray falls within this range, the movement of the molecular chain is activated. In this step, when the wavelength of the light emitted from the light source has a width, it is preferred that the wavelength to be the dominant wavelength of the light falls within this range. The lower limit of the wavelength of the infrared ray is preferably 700 nm, more preferably 800 nm, still more preferably 900 nm, and particularly preferably 1,000 nm. On the other hand, the upper limit of the infrared ray wavelength is preferably 1,000,000 nm, more preferably 10,000 nm, still more preferably 4,000 nm, even more preferably 3,000 nm, and particularly preferably 2,500 nm. When the wavelength of the infrared ray is below the lower limit, movement of the molecular chain in the resin may be less likely to be activated. On the other hand, when the wavelength of the infrared ray is beyond the upper limit, a dehydration reaction proceeds to increase double bonds in the main chain due to excessively elevated temperature of the resin containing EVAc or EVOH, leading to enhanced coloring, whereby the appearance may be deteriorated. It is to be noted that the wavelength of the infrared ray as referred to herein means a maximum energy wavelength of the light source of the infrared ray, and may be measured using a radiance spectrum or the like.

Although the intensity of the infrared ray is not particularly limited, it is preferably $30 \times 10^3$ W/m$^3$ or greater and $3,000 \times 10^3$ W/m$^3$ or less. When the intensity of the infrared ray falls within this range, coloring such as yellowing can be further prevented.

The lower limit of the intensity of the infrared ray is preferably $30 \times 10^3$ W/m$^3$, more preferably $100 \times 10^3$ W/m$^3$, still more preferably $150 \times 10^3$ W/m$^3$, and particularly preferably $240 \times 10^3$ W/m$^3$. On the other hand, the upper limit of the intensity of the infrared ray is preferably $3,000 \times 10^3$ W/m$^3$, more preferably $2,000 \times 10^3$ W/m$^3$, still more preferably $1,400 \times 10^3$ W/m$^3$, and particularly preferably $350 \times 10^3$ W/m$^3$. When the intensity of the infrared ray is smaller than the lower limit, the coloring may not be sufficiently prevented. On the other hand, when the intensity of the infrared ray is beyond the upper limit, the dehydration reaction proceeds to increase the double bonds in the main chain of EVOH due to excess elevation of the resin temperature, whereby the appearance may be deteriorated, and handleability may be impaired as a result of dissolution of the resin.

In this regard, the intensity of the infrared ray can be determined by calculating according to the following formula (I) when a columnar vessel charged with a resin prepared as a solution is irradiated with an infrared ray from above.

$$\text{Intensity of infrared radiation} = \frac{\text{wattage of infrared radiation lamp}}{\begin{pmatrix}\text{distance from the infrared}\\\text{radiation light source to}\\\text{the vessel}\end{pmatrix} \times \begin{pmatrix}\text{area of the vessel}\\\text{irradiated with the}\\\text{infrared radiation}\end{pmatrix}} \quad (I)$$

It should be noted that also in the case of resins having a granular form such as pellets or a film form, the intensity of the infrared ray can be calculated according to the above calculation process.

The irradiation time of the infrared ray is preferably 0.1 hours or longer and 20 hours or shorter. When the irradiation time of the infrared ray falls within this range, occurrence of coloring such as yellowing can be further prevented.

Accordingly, in the case of infrared rays, deterioration of the resin is not found when the irradiation time is 20 hours or shorter. Whereas, deterioration of the resin is found for 300 sec longer when the wavelength of the infrared ray is beyond 1,000,000 nm (for example, microwave); therefore, it is concluded that the irradiation time of the irradiation with an infrared ray can be easily adjusted.

The lower limit of the irradiation time of the infrared ray is preferably 0.1 hours, more preferably 0.3 hours, still more preferably 0.4 hours, and particularly preferably 0.5 hours. On the other hand, the upper limit of the irradiation time of the infrared ray is preferably 20 hours, more preferably 10 hours, still more preferably 5 hours, and particularly preferably 1 hour. When the irradiation time of the infrared ray is shorter than the lower limit, the coloring may not be sufficiently prevented. On the other hand, when the irradiation time is beyond the upper limit, elevation of the resin temperature becomes drastic, whereby deterioration of the resin is significantly enhanced, and also handleability may be deteriorated due to dissolution of the resin.

<Method for Producing EVOH Resin>

Hereinafter, the method for producing an EVOH resin of the present invention is specifically explained. Specifically, the method for producing an EVOH resin of the present invention has, similarly to general methods for producing EVOH resins:

a polymerization step for copolymerizing ethylene and a vinyl ester to obtain EVAc;

a saponification step for saponifying the EVAc to obtain EVOH;

a pelletization step for obtaining a pellet containing EVOH from a solution or paste containing EVOH obtained in the saponification step;

a washing step for washing the pellet;

a drying step for drying the pellet; and a molding step for molding the pellet to obtain a molded product including EVOH, and furthermore, the aforementioned step of irradiation with an infrared ray is included. It should be noted that steps other than the saponification step are not prerequisite.

(Polymerization Step)

Although a copolymerization process of ethylene with the vinyl ester is not particularly limited, for example, any of solution polymerization, suspension polymerization, emulsion polymerization, bulk polymerization and the like may be employed. Also, either a continuous system or a batchwise system may be employed.

As the vinyl ester used in polymerization, fatty acid vinyl such as vinyl acetate, vinyl propionate or vinyl pivalate, or the like may be suitably used.

In the polymerization described above, in addition to the aforementioned components, a copolymerizable monomer may be also copolymerized in a small amount as a copolymerization component such as, for example, an alkene other than those described above; an unsaturated acid such as acrylic acid, methacrylic acid, crotonic acid, maleic acid or itaconic acid, or an anhydride, a salt, a mono- or dialkyl ester thereof, or the like; nitrile such as acrylonitrile or methacrylonitrile; amide such as acrylamide or methacrylamide; olefin sulfonic acid such as vinylsulfonic acid, allylsulfonic acid or metaallylsulfonic acid, or a salt thereof; an alkyl vinyl ether, vinyl ketone, N-vinylpyrrolidone, vinyl chloride, vinylidene chloride or the like.

Additionally, a vinylsilane compound may be included in an amount of 0.0002 mol % or greater and 0.2 mol % or less as a copolymerization component. Herein, the vinylsilane compound may include, for example, vinyltrimethoxysilane, vinyltriethoxysilane, vinyltri(β-methoxy-ethoxy)silane, γ-methacryloyloxypropylmethoxysilane or the like. Of these, vinyltrimethoxysilane, or vinyltriethoxysilane is suitably used.

A solvent which may be used in the polymerization is not particularly limited as long as it is an organic solvent which can dissolve ethylene, vinyl ester and the ethylene-vinyl ester copolymer. As such a solvent, for example, an alcohol such as methanol, ethanol, propanol, n-butanol or tert-butanol; dimethyl sulfoxide or the like may be used. Of these, methanol is particularly preferred in light of ease in removal and separation after the reaction.

As a catalyst for use in the polymerization, for example, an azonitrile based initiator such as 2,2-azobisisobutyronitrile, 2,2-azobis-(2,4-dimethylvaleronitrile), 2,2-azobis-(4-methoxy-2,4-dimethylvaleronitrile) or 2,2-azobis-(2-cyclopropylpropionitrile); an organic peroxide based initiator such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide, t-butyl hydroperoxide, or the like may be used.

The polymerization temperature is preferably 20° C. or greater and 90° C. or less, and more preferably 40° C. or greater and 70° C. or less. Polymerization time is preferably 2 hours or longer and 15 hours or shorter, and more preferably 3 hours or longer and 11 hours or shorter. The rate of polymerization is preferably 10% or greater and 90% or less, and more preferably 30% or greater and 80% or less relative to the vinyl ester charged. The resin content in the solution after the polymerization is preferably 5% by mass or greater and 85% by mass or less, and more preferably 20% by mass or greater and 70% by mass or less.

After carrying out the polymerization for a predetermined time, or after reaching a predetermined rate of polymerization, a polymerization inhibitor is added if necessary, and unreacted ethylene gas is removed by evaporation, followed by removing unreacted vinyl ester. As a process of removing an unreacted vinyl ester, for example, a process including continuously supplying the copolymer solution at a constant rate through an upper part of a tower filled with Raschig ring, blowing therein an organic solvent vapor such as methanol through a lower part of the tower, distilling off mixed vapor of the organic solvent such as methanol and unreacted vinyl ester through the top of the tower, and taking out the copolymer solution from which the unreacted vinyl ester was removed through the bottom of the tower, or the like may be employed.

(Step of Irradiation with Infrared Ray 1: Irradiation on EVAc)

By irradiating the ethylene-vinyl ester copolymer (EVAc) prior to saponification obtained by the aforementioned process with an infrared ray, an EVOH resin having sufficient long-run workability in melt molding, and enabling prevention of coloring such as yellowing can be finally obtained. The temperature of the EVAc resin in irradiation with an infrared ray is preferably 40° C. or greater and 110° C. or less. When the temperature of the EVAc resin falls within this range, the polyene compounds included in the resin are volatilized, and thus occurrence of coloring such as yellowing can be further prevented. In this respect, the EVAc resin on which an infrared ray is irradiated may be either a paste composed of the copolymer, or a solution containing the copolymer.

Note that in the case in which a solution containing the EVAc resin is employed, the temperature of the EVAc resin is equal to the temperature of the solution. In the case of a solid such as a paste, the temperature of the EVAc resin is determined by measuring the temperature of the paste or the like with a thermometer inserted into the paste every 5 min until a constant measurement is found, and calculating an average temperature of the measurements found at five sites.

The lower limit of the temperature of EVAc during the irradiation with an infrared ray is preferably 40° C., more preferably 45° C., still more preferably 50° C., and particularly preferably 60° C. On the other hand, the upper limit of the temperature of the copolymer is preferably 110° C., more preferably 90° C., still more preferably 80° C., and particularly preferably 70° C. When the temperature of the copolymer is below the lower limit, movement of the molecular chain of EVAc becomes insufficient, volatilization of the polyene compounds that become the cause of coloring does not occur sufficiently. On the other hand, when the temperature is beyond the upper limit, deterioration of the copolymer proceeds, leading to enhanced coloring, and thus the appearance of the resulting EVOH resin may be finally deteriorated.

(Saponification Step)

Next, a step of saponifying EVAc is included in the present invention. The saponification process may be either continuous system, or a batchwise system. The catalyst which may be used in the saponification is not particularly limited, but is preferably an alkali catalyst, and for example, sodium hydroxide, potassium hydroxide, alkali metal alcoholate or the like may be used.

Conditions of saponification may include, for example, in the case of batchwise system: copolymer solution concentration being 10% by mass or greater and 50% by mass or less; the reaction temperature being 30° C. or greater and 60° C. or less; the amount of the catalyst used being 0.02 mol or greater and 0.6 mol or less per mol of the vinyl ester structural unit; and the saponification time being 1 hour or longer and 6 hours or shorter.

In this manner, a solution or a paste containing EVOH is obtained. Since EVOH yielded after completing the saponification reaction contains the alkali catalyst, by-product salts such as sodium acetate and potassium acetate, and other impurities, these are preferably removed by neutralizing and washing as needed. When EVOH after completing the saponification reaction is washed with water that scarcely contains metal ion, chloride ion and the like such as ion exchanged water, sodium acetate, potassium acetate and the like may partly remain.

(Pelletization Step)

Next, in the pelletization step, the EVOH solution or paste obtained as described above is pelletized. Pelletization method is not particularly limited, and a method in which a solution of EVOH in a mixture of an alcohol and water is cooled to permit coagulation, followed by cutting; a method in which EVOH is melt kneaded in an extruder and discharged, followed by cutting, and the like may be exemplified. Specific examples of the cutting method of EVOH include: a method in which EVOH is extruded to give a strand form, followed by cutting with a pelletizing machine; a method in which EVOH discharged from a die is cut by a hot center cutting system or an underwater cutting system, etc.; and the like.

When an EVOH solution is pelletized by extrusion to give a strand form, water or a water/alcohol mixed solvent, aromatic hydrocarbons such as benzene, ketones such as acetone and methyl ethyl ketone, ethers such as dipropyl ether, organic acid esters such as methyl acetate, ethyl acetate and methyl propionate, and the like may be used as a solidification liquid for use in coagulation, but water or a water/alcohol mixed solvent is preferred in light of easy handling. As the alcohol, methanol, ethanol, propanol or the like may be used, and methanol is preferably used in terms of industrial aspects. Although the mass ratio of the solidification liquid to the strand of EVOH in the solidification liquid (solidification liquid/strand of EVOH) is not particularly limited, it is preferably 50 or greater and 10,000 or less, and more preferably 100 or greater and 1,000 or less. When the mass ratio falls within this range, to obtain an EVOH pellet having uniform size distribution is enabled.

The temperature at which the EVOH solution is brought into contact with the solidification liquid is preferably −10° C. or greater and 40° C. or less, more preferably 0° C. or greater and 20° C. or less, and particularly preferably 0° C. or greater and 10° C. or less. The EVOH solution is extruded into the solidification liquid as described above to give a strand form with a nozzle having an arbitrary form. Although the shape of such a nozzle is not particularly limited, it is preferably a circular cylindrical shape. Thus, EVOH (solution) is extruded to give a strand form from the nozzle. In this process, the strand may not necessarily be single, and can be extruded to provide arbitrary number of several strands to several hundred strands.

Next, EVOH extruded to give a strand form is cut after sufficiently solidified, and then pelletized followed by washing with water. With respect to the form of such a pellet, the diameter is preferably 1 mm or greater and 10 mm or less, and the length is preferably 1 mm or greater and 10 mm or less (more preferably, each being 2 mm or greater and 6 mm or less) in the case of a circular cylinder, or the diameter is preferably 1 mm or greater and 10 mm or less (more preferably being 2 mm or greater and 6 mm or less) in the case of a sphere.

(Washing Step)

Subsequently, the EVOH pellet is preferably washed with water at a temperature of 10° C. or greater and 80° C. or less in a water bath. Oligomers and impurities in EVOH are removed by such a washing step with water.

(Drying Step)

Thereafter, a drying step may be included in which the pellet is dried to give a water content of 0.01% by mass or greater and less than 10% by mass. Although the drying process is not particularly limited, hot-air drying may be exemplified. It is to be noted that the drying step may be also carried out by irradiation with an infrared ray described later in detail.

(Molding Step)

In addition, the dried EVOH resin may be formed into any of various types of a molded product such as a film, sheet, container, pipe or fiber by melt molding. It is possible to subject these molded articles to remolding for the purpose of reuse of the same after grinding. Alternatively, the film, sheet, fiber or the like can also be monoaxially or biaxially stretched.

As the melt molding process, extrusion molding, inflation extrusion, blow molding, melt spinning, injection molding and the like are permitted.

The melt temperature in carrying out the melt molding is not particularly limited, but is preferably about 150° C. or greater and 300° C. or less.

(Step of Irradiation with Infrared Ray 2: Irradiation on EVOH)

Also by irradiating EVOH with an infrared ray carried out not before subjecting to the aforementioned saponification step, an EVOH resin having sufficient long-run workability in melt molding, and enabling prevention of coloring such as yellowing can be finally obtained. The resin containing EVOH irradiated with an infrared ray may be any one of a solution, a paste, a pellet or a molded product including EVOH. The timing when the step of irradiating with an infrared ray is carried out is not particularly limited as long as it is carried out simultaneously with the saponification step or following the saponification step, and the irradiation step may be carried out at a time of, for example:

(1) simultaneously with the saponification step, or after the saponification step and before the pelletization step;

(2) simultaneously with the pelletization step, or after the pelletization step and before the washing step;

(3) simultaneously with the washing step, or after the washing step and before the drying step;

(4) simultaneously with the drying step, or after the drying step and before the molding step; or (5) simultaneously with the molding step, or after the molding step.

Of these, carrying out the step of irradiation with an infrared ray is carried out preferably not before the pelletization step, and specifically, carrying out not before the time (2) above is preferred since the concentration of the EVOH resin is low in the case of solution and paste forms. In addition, the pellet before subjecting to the drying step has a so high water content that the resin temperature is not satisfactorily elevated by irradiation with an infrared ray, whereby the polyene compound may not be volatilized enough; therefore, the irradiation with an infrared ray is also preferably carried out not before the drying step, and more specifically not before the time (4) above. On the other hand, in the case of molded products such as films, the water content is low, and thus azeotropy of the polyene compound with water is less likely to occur; therefore, the irradiation with an infrared ray is carried out preferably on a dried pellet, and more specifically according to the (4) above. When the irradiation with an infrared ray is carried out at the time (4), volatilization of the moisture of EVOH is enabled; therefore, the irradiation with an infrared ray can achieve a function as a drying step as described later. Also, in light of effective volatilization of the polyene compound on the surface of the final molded product and prevention of yellowing, irradiating an infrared ray according to the (5) above is preferred.

The lower limit of the temperature of the EVOH resin in the irradiation with an infrared ray is preferably the glass transition temperature of the EVOH, more preferably 80° C., still more preferably 100° C., and particularly preferably 120° C. On the other hand, the upper limit of the resin temperature is preferably the melting temperature of EVOH, more preferably 160° C., still more preferably 155° C., and particularly preferably 150° C. When the resin temperature is below the lower limit, the stretching vibration of the hydroxyl group included in the resin is not sufficient, and thus volatilization of polyene does not occur enough. On the other hand, when the resin temperature is beyond the upper limit, deterioration of the resin proceeds, leading to enhanced coloring, and thus the appearance may be deteriorated. A glass transition temperature and a melting temperature of the EVOH described above are temperature values measured in a dry state.

Note that in the case in which a solution containing the EVOH resin is employed, the temperature of the EVOH resin is equal to the temperature of the solution. In the case of a paste, a pellet or a molded product, the temperature of the EVOH resin is determined by measuring the temperature of the paste, the pellet stacked or the molded product with a thermometer inserted into it every 5 min until a constant measurement is found, and calculating an average temperature of the measurements found at five sites.

When the irradiation with the infrared ray is carried out on a pellet prior to the drying step, the upper limit of the water content of the pellet before irradiating with an infrared ray is preferably 200% by mass, more preferably 170% by mass, still more preferably 140% by mass, and particularly preferably 110% by mass. When the water content of the pellet is beyond the upper limit, the resin temperature is not sufficiently elevated by the irradiation with an infrared ray due to too high water content, and thus the polyene compound may not be volatilized enough. On the other hand, although the lower limit of the water content of the pellet before irradiating with an infrared ray is not particularly limited, it may be 10% by mass.

Moreover, when the irradiation with an infrared ray is carried out simultaneously with or after the drying step, the lower limit of the water content of the pellet and the molded product before irradiating with an infrared ray is preferably 0.01% by mass, more preferably 0.02% by mass, still more preferably 0.03% by mass, and particularly preferably 0.05% by mass. When the water content of the pellet and the film that is a molded product, or the like is below the lower limit, volatilization by way of azeotropy of the polyene compound with water does not sufficiently occur due to the too low water content. On the other hand, although the upper limit of the water content of the pellet and the molded product before irradiating with an infrared ray is not particularly limited, when irradiation with an infrared ray is carried out simultaneously with the drying step, the upper limit of the water content of the pellet before the irradiation with an infrared ray is preferably 200% by mass. Whereas, when the irradiation with an infrared ray is carried out not before the drying step, the upper limit of the water content of the pellet and molded product before the irradiation with an infrared ray is preferably 9% by mass, more preferably 1% by mass, and particularly preferably 0.5% by mass in terms of its step.

It should be noted that the water content value (% by mass) is on dry basis unless otherwise stated in particular. The water content on dry basis is a value derived by dividing the mass of water included in a pellet by the dry mass of the EVOH resin included in the pellet. Also with respect to molded products such as films may be similar determination can be carried out.

(Step of Irradiation with Infrared Ray 3 (Drying Step): Irradiation as Drying Means)

As described above, it is preferred that the irradiation with an infrared ray is carried out on the solid matter containing EVOH and water (the pellet, etc.), and that the solid matter is dried by the irradiation with an infrared ray. Thus drying by the irradiation with an infrared ray enables the solid matter containing EVOH to be efficiently dried even at a low atmospheric temperature and within a short drying time period. The drying time period which can be shortened allows for the size reduction of a facility required for achieving a processing capacity equivalent to that in conventional technologies, thereby leading to an advantage such as a reduction in cost for establishment of the facility. In addition, according to this embodiment, an EVOH resin sufficiently dried and accompanied by less deterioration of qualities can be obtained.

The solid matter as referred to herein is a generic name of a composition containing water and an EVOH resin, and the state of water included is not particularly limited. For example, also in the case in which water is homogenously retained in the EVOH resin, and the case in which the EVOH resin and water are nonhomogeneously mixed, the effects of the present invention can be achieved without particular limitation. In specific examples of the state of water included: water may be included in the pellet obtained in the pelletization step; or water may remain in a small amount in the pellet after subjecting to the drying step, and water may be attached when the EVOH resin melt molded in the molding step is water-cooled.

When the infrared ray is directly irradiated on the solid matter, energy of the infrared ray can be directly imparted to the solid matter which is to be heated. In other words, in the step of irradiation with an infrared ray 3, drying by radiant heat transfer is executed. Therefore, according to the method for production, more efficient heating of the solid matter is enabled as compared with hot-air drying (drying by convective heat transfer) carried out using conventional heating gas. Furthermore, according to such a drying method, extreme elevation of the surface temperature of the solid matter can be prevented, whereby agglutination of solid matter particles, and/or deterioration of the resultant resin can be prevented. In addition, since the drying step enables a low atmospheric temperature to be maintained, drying rate can be increased as a result of an increased difference between the temperatures of the matter to be heated and the air.

When the solid matter is dried by the irradiation with an infrared ray, the solid matter is preferably granular (the pellet, etc.). By carrying out the irradiation with an infrared ray on the granular solid matter, efficiency of drying and the like can be further enhanced. It should be noted that the effects of the embodiment of the present invention can be achieved even if the infrared ray is irradiated on any solid matter other than the granular matter such as e.g., solid matters having a film form and fiber form.

The shape of the granular solid matter (granular matter) is not particularly limited, and may be exemplified by a pellet shape having a columnar shape such as a circular cylindrical shape, or a spherical shape, as well as a chip shape, a crumb shape, a flake shape, a powdery shape, etc. Of these, a pellet form is preferred. By using the granular matter having a pellet form, agglutination of granular matter particles can be efficaciously inhibited.

The size of the granular matter is not particularly limited, and for example, 1 $mm^3$ or greater and 100 $cm^3$ or less, preferably 3 $mm^3$ or greater and 1 $cm^3$ or less, and more preferably 5 $mm^3$ or greater and 200 $mm^3$ or less. When the granular matter having a size falling within the above range is used, efficiency of drying, etc., can be enhanced such as easier irradiation inside, with the infrared ray.

The wavelength of the infrared ray in the step of irradiation with an infrared ray 3 is preferably 700 nm or greater and 10,000 nm or less, more preferably 1,000 nm or greater and 8,000 nm or less, and still more preferably 1,500 nm or greater and 4,500 nm or less. Since the wavelength range falls within a range of shorter wavelength in the range of the wavelength of the infrared rays described above, the energy of the ray of light is comparatively great, and thus such an infrared ray is suited for drying the solid matter. In particular, since water molecules have a maximal absorption of infrared rays at around 2,000 to 4,000 nm, irradiation with the infrared ray within this range can effectively impart the energy to the solid matter.

The atmospheric temperature in the step of irradiation with an infrared ray 3 is preferably 10° C. or greater and 100° C. or less, more preferably 20° C. or greater and 80° C. or less, and still more preferably 30° C. or greater and 50° C. or less. In this regard, the atmospheric temperature means a temperature of the air in the vicinity of the solid matter to be heated (not far by 30 cm from the surface). Note that when the drying is carried out in a space that will have substantially equal temperature, for example, when the drying of the solid matter is carried out in a vessel into which an infrared ray lamp is placed, the atmospheric temperature may correspond to the temperature inside the vessel. Moreover, the atmospheric temperature as referred to herein means an average temperature in the step of irradiation with an infrared ray 3.

When the atmospheric temperature is beyond the upper limit, the surface of the solid matter is likely to be deteriorated, whereby gelation, coloring and the like may occur. In addition, when the atmospheric temperature is beyond the upper limit, the difference between the atmospheric temperature (the temperature of the air) and the temperature of the solid matter becomes so small that drying rate may be decreased. To the contrary, when the atmospheric temperature is below the lower limit, dew condensation of the vapor generated by drying occurs, and the dew drop may attach to the solid matter during drying, whereby the efficiency of drying may be impaired, and agglutination of the solid matter may be caused.

The temperature of the solid matter in the step of irradiation with an infrared ray 3 is preferably 80° C. or greater and 160° C. or less, more preferably 90° C. or greater and 150° C. or less, and still more preferably 100° C. or greater and 140° C. or less. In general, the drying rate increases as the temperature of the solid matter subjected to drying is higher. However, EVOH in a wet state has a lower melting temperature as compared with that of EVOH in a dry state. Thus, when the temperature of the solid matter in the step of irradiation with an infrared ray 3 exceeds the upper limit, the solid matter particles may agglutinate with one another by melting. In addition, the temperature of the solid matter beyond the upper limit may lead to, even if the temperature does not reach the melting temperature, loss of transparency of the surface through getting opacity, and/or inclusion of bubbles in the solid matter etc., whereby the appearance may be deteriorated. To the contrary, when the temperature of the solid matter is below the lower limit, evaporation of water in the solid matter is delayed, and thus a long time period for drying may be required. Note that the temperature of the solid matter as referred to herein is a temperature of the surface of the solid matter, and may be measured by, for example, a radiation temperature sensor and the like. Furthermore, the temperature of the solid matter as referred to means an average temperature in the step of irradiation with an infrared ray 3.

The difference between the atmospheric temperature and the temperature of the solid matter (a value derived by subtracting the temperature of the solid matter from the atmospheric temperature) in the step of irradiation with an infrared ray 3, is preferably 10° C. or greater, more preferably 30° C. or greater, and still more preferably 50° C. or greater. By making such a difference between temperatures of the air (atmosphere) and the solid matter, the efficiency of drying can be further enhanced, and the surface can be prevented from deterioration. Note that although the temperature between the atmospheric temperature and the temperature of the solid matter is preferably as great as possible, the upper limit may be, for example, 120° C.

The upper limit of the water content of the solid matter subjected to the step of irradiation with an infrared ray 3 is preferably 200% by mass, more preferably 50% by mass, still more preferably 10% by mass, and particularly preferably 5% by mass. Also, the lower limit of the water content is preferably 0.5% by mass.

When the water content exceeds the upper limit, solid matter may be likely to bubble or agglutinate during drying. Note that in the case of drying by convective heat transfer using a conventional heating gas, the drying rate may be decreased when the water content of the solid matter is low (e.g., less than 10% by mass). On the other hand, the drying carried out using an infrared ray according to the embodiment of the present invention predominantly utilizes radiant heat transfer; therefore, the drying rate is less likely to be decreased even in a poorly wet state with the water content of less than 10% by mass. Therefore, according to the method for production, further efficient drying can be executed as compared with conventional drying methods, particularly in poorly wet states.

The water content of the solid matter after subjecting to the step of irradiation with an infrared ray 3 is preferably less than 0.5% by mass, and more preferably 0.3% by mass or less. By drying to give such a water content, formability and the like of the resultant solid matter can be improved.

Although the drying time period in the step of irradiation with an infrared ray 3 (irradiation time of the infrared ray) is not particularly limited, when the solid matter is granular, the drying time period is preferably 0.5 hours or greater and 60 hours, and more preferably 1 hour or greater and 5 hours or less. When the drying time period is below the lower limit, achieving sufficient drying may fail. To the contrary, the drying time period beyond the upper limit is not preferred in light of the acceleration of the drying rate.

It should be noted that in the step of irradiation with an infrared ray 3 according to the present embodiment, for example, other drying means such as air blowing and irradiation with a microwave, etc., may be incorporated simultaneously with irradiation with the infrared ray.

<Irradiation Method With Infrared Ray>

In the step of irradiation with an infrared ray, particularly in the step of irradiation with an infrared ray 3, it is preferred that the infrared ray is irradiated while agitating the granular matter when the solid matter is granular. In the step of irradiation with an infrared ray, when the granular matter is left to stand still, the infrared ray is absorbed on the surficial layer of the granular matter, and thus only the surficial layer of the pellet is heated. In this instance, a portion not irradiated with the infrared ray fails to be heated; therefore, efficiency of irradiation (efficiency of drying) is impaired, and the portion irradiated in a concentrated manner may be likely to be deteriorated. Therefore, by thus agitating the granular matter, and uniformly heating the granular matter subjected to the step of irradiation with an infrared ray, the granular matter can be efficiently dried.

The method for irradiating with the infrared ray while agitating the granular matter is not particularly limited, and is exemplified by: a method for irradiating with the infrared ray while agitating the granular matter by placing the granular matter in a rotary drum and rotating the rotary drum; a method for irradiating with the infrared ray while agitating the granular matter in a vessel equipped with a screw or a mixing blade; and the like. Preferred drying devices for irradiating with the infrared ray while agitating the granular matter in a rotary drum will be described later in detail.

Furthermore, it is also preferred that in the step of irradiation with an infrared ray, the infrared ray is irradiated while conveying the granular solid matter on a conveyor. By thus irradiating with the infrared ray while conveying a constant amount of the granular solid matter on a conveyor at a constant speed, an uniform infrared ray can be stably irradiated on the granular matter. As a result, a granular matter having a stable quality (having a constant water content) can be obtained, and production efficiency of the EVOH resin can be enhanced.

On the other hand, in the step of irradiation with an infrared ray, when the granular matter is irradiated with the infrared ray in a static state without agitation, it is preferred that the granular matter is arranged without stacking to give multiple layers. Thus arranged granular matter can be uniformly irradiated with an infrared ray. Specifically, in this process, it is preferred to adjust the thickness of the arranged granular matter along the direction of irradiation with the infrared ray to be 30 mm or less. When the thickness of the arranged granular matter exceeds 30 mm, irradiation of the granular matter positioned around the bottom part may be insufficient, and thus efficiency of irradiation (efficiency of drying) and the like may be impaired.

In the step of irradiation with an infrared ray, any of a batchwise system, and a continuous system may be applied. In addition, the step of irradiation with an infrared ray is further divided into a plurality of steps (for example, first irradiation step with an infrared ray (drying) and a second irradiation step with an infrared ray (dry), etc.), and thus the batchwise system and the continuous system can be combined. When the step of irradiation with an infrared ray is divided into a plurality of steps, irradiation equipment of an infrared ray with different output can be used, and/or change of the wavelength of the infrared ray and the intensity used in each step is also enabled. In addition, the atmospheric temperature and the temperature of the granular matter can be changed for each step.

For example, when a solid matter having a high water content is dried, the drying is carried out at a comparatively low temperature of the granular matter so as to be the melting temperature or less of the solid matter, and thus the drying is enabled such that the temperature of the solid matter is elevated as the melting temperature increases due to a decrease of the water content of the solid matter. According to such a method, the bubbling and occurrence of opacity of the solid matter as described above can be inhibited, and the solid matter can be efficiently dried.

<Drying Device>

One example of a drying device used in the step of irradiation with an infrared ray 3 (drying step) will be explained with reference to FIGS. 1 and 2, but the mode of the drying device is not limited thereto. FIG. 1 shows a schematic perspective view illustrating a drying device 1, and FIG. 2 shows a schematic cross sectional view illustrating the drying device 1. It should be noted that the drying device explained below can be also used as an irradiation equipment of an infrared ray in the step of irradiation with an infrared ray other than the step of irradiation with an infrared ray 3 (drying step).

The drying device 1 shown in FIG. 1 principally includes a rotary drum 2, an infrared ray lamp 3 and a motor 4.

The rotary drum 2 has a circular cylindrical shape. The size of the rotary drum 2 is not particularly limited, and may be appropriately designed in accordance with the amount and the like of the granular matter to be dried at a time. The rotary drum 2 is connected to the motor 4 via a belt 5. In other words, the rotary drum 2 is configured so as to rotate along with the rotation of the motor 4. A granular matter A is charged into the rotary drum 2.

The rotation frequency of the rotary drum 2 may be appropriately set in accordance with the conditions and the like, and is preferably 10 rpm or greater and 50 rpm or less. When the rotation frequency falls within such a range, efficient and uniform irradiation with an infrared ray can be carried out, and efficiency of drying and the like can be enhanced while maintaining the quality of the resultant resin.

The infrared ray lamp 3 has a columnar shape, and is disposed substantially along a central axis in the rotary drum 2. One lateral face of the infrared ray lamp 3 serves as a ray exit surface 3a where the infrared ray emerges. Two ends of the infrared ray lamp 3 are fixed by way of a shaft 6. The ray exit surface 3a is configured such that the angle of emergence can be adjusted. The infrared ray lamp 3 irradiates a part of the interior of the rotary drum 2, i.e., the granular matter A charged.

The distance between the ray exit surface 3a of the infrared ray lamp 3 and the granular matter A (hereinafter, referred to as "irradiation distance X") is preferably 5 mm or greater and less than 500 mm. When the irradiation distance is less than 5 mm, the temperature of the granular matter A is significantly elevated so that baking and/or burning may be caused. To the contrary, when the irradiation distance X is 500 mm or greater, the energy of the infrared ray is not sufficiently imparted to the granular matter, whereby the drying rate may be decreased.

The output of the infrared ray lamp 3 is appropriately adjusted in accordance with the amount of the granular matter A, the shape of the rotary drum 2 and the like, and is preferably 1.0 kW or greater and 5.0 kW or less.

Specific examples of the infrared ray lamp 3 include various types of halogen lamps manufactured by Ushio Inc., a short wavelength infrared ray lamp and a middle wavelength infrared ray lamp manufactured by Heraeus Holding GmbH, a halogen lamp manufactured by TOKO, INC., and the like. A plurality of lamps may be suitably used at once.

According to the drying device 1, since rotary drum is rotated by the motor 4, the granular matter A is agitated in connection with the rotation of the rotary drum 2. It should be noted that the entire surface of the granular matter A (flowing face) is inclined in this process, as shown in FIG. 2. Therefore, the infrared ray lamp 3 can efficiently irradiate the infrared ray on the granular matter A by changing the irradiate angle in accordance with the angle of inclination of the flowing face.

Furthermore, the drying device may be additionally provided with control means of the lamp output and rotation frequency, as well as air blowing means, other drying means, and the like.

As the other means described above, the drying device is preferably provided with, for example, a means for controlling the irradiation dose and the emergence dose of the infrared ray depending on the temperature of the granular matter. When such the drying device is provided with such a means, rapid drying can be executed while further inhibiting deterioration of the resin. Examples of the control means of the irradiation dose and the emergence dose of the infrared ray may involve: (1) a method which includes connecting the infrared ray lamp with an electric power regulation unit, and controlling the output of the infrared ray on the basis of the temperature of the granular matter measured; (2) a method which includes controlling switching of execution of the irradiation with the infrared ray on the basis of the temperature of the granular matter measured; and the like. These control methods may be employed in combination using a plurality of infrared ray lamps.

<Other Step, Etc.>

It is also preferred that between the pelletization step and the step of irradiation with an infrared ray 3 (drying step), a preliminary drying step is included for decreasing the water content of the granular matter to some extent (for example, 10% by mass or less, and preferably, 5% by mass or less). As described above, the step of irradiation with an infrared ray 3 can exert the effect particularly in a state with low water content. Therefore, by incorporating such a preliminary drying step, efficiency of drying can be further enhanced. The drying method in the preliminary drying step may be exemplified by a method in which heating gas (hot air, etc.) is used, as well as a method in which a centrifugal dehydrator is used, and the like. Although the drying time period in this preliminary drying step is not particularly limited, for example, the drying time period may be 1 hour or greater and 10 hours or less.

<EVOH Resin>

The EVOH resin of the present invention is obtained by the aforementioned method for production. The EVOH resin has sufficient long-run workability in melt molding and enables coloring such as yellowing to be prevented. In addition, when subjected to the step of irradiation with an infrared ray 3 (drying by infrared ray), deterioration of the EVOH resin is further inhibited; therefore, such an EVOH resin can be applied to various types of intended usage as a resin that is superior in quality.

The content of EVOH contained in the EVOH resin is preferably 60% by mass or greater, more preferably 80% by mass or greater, and still more preferably 95% by mass or greater.

EVOH in the EVOH resin is a polymer having an ethylene unit ($-CH_2-CH_2-$) and a vinyl alcohol unit ($-CH_2-CHOH-$) as main structural units.

The lower limit of the ethylene content of EVOH (i.e., rate of the number of ethylene units relative to the total number of monomer units in EVOH) is preferably mol %, more preferably 25 mol %, and still more preferably 30 mol %. On the other hand, the upper limit of the ethylene content in EVOH is preferably 60 mol %, more preferably 55 mol %, still more preferably 50 mol %, and particularly preferably 45 mol %. When the ethylene content of EVOH falls within this range, sufficient appearance characteristics and long-run workability can be achieved. When the ethylene content in EVOH is below the lower limit, for example, water resistance, hot water resistance and gas barrier properties under high humidity achieved upon molding a laminate may be deteriorated, or deterioration of melt formability, occurrence of yellowing and the like may be caused. To the contrary, when the ethylene content of EVOH is beyond the upper limit, deterioration of gas barrier properties achieved upon molding a laminate, and occurrence of yellowing and the like may be likely to be caused. Moreover, when the ethylene content is below the above lower limit, deterioration of EVOH is likely to proceed when irradiated with the infrared ray. To the contrary, when the ethylene content exceeds the upper limit described above, the melting temperature of EVOH is lowered; therefore, the solid matter may be melted in the drying step (step of irradiation with an infrared ray 3).

The lower limit of the degree of saponification of EVOH (i.e., rate of the number of vinyl alcohol units relative to the total number of vinyl alcohol units and vinyl ester units in EVOH) is preferably 90 mol %, more preferably 95 mol %, and particularly preferably 99 mol %. On the other hand, the upper limit of the degree of saponification of EVOH is preferably 100 mol %, and still more preferably 99.99 mol %. When the degree of saponification of EVOH is below the lower limit, gas barrier properties achieved upon molding a laminate may be deteriorated, and coloring resistance may be unsatisfactory. Additionally, when the degree of saponification is less than the above lower limit, the solid matter may be melted in the drying step (step of irradiation with an infrared ray 3).

In the case in which EVOH is constituted with a mixture of two or more kinds of EVOHs having different ethylene contents, the ethylene content is defined as an average value calculated from the mixed mass ratio. In this case, it is preferred that the maximum difference between ethylene contents of two EVOHs is 30 mol % or less, and the difference between degrees of saponification is preferably 10 mol % or less. When carried out under conditions out of these requirements, gas barrier properties achieved upon molding a laminate may be deteriorated. The difference in ethylene contents is more suitably 20 mol % or less, and more suitably 15 mol % or less. Also, the difference in the degrees of saponification is more suitably 7% or less, and still more suitably 5% or less.

(Additives)

In order to improve each performance, the EVOH resin obtained by the method for production of the present invention preferably contains a variety of additives such as acid, metal salts, etc. The additives may include alkali metal salts, carboxylic acids and/or carboxylate ions, phosphate compounds and boron compounds described later. According to the method for production of the present invention, occurrence of yellowing and the like can be prevented also when these additives are contained in the resin.

The EVOH resin of the present invention preferably contains an alkali metal ion in light of thermal stability. The content of the alkali metal ion in dry EVOH resin is preferably 2.5 μmol/g or greater and 22 μmol/g or less, more preferably 3.5 μmol/g or greater and 16 μmol/g or less, and particularly preferably 4.5 μmol/g or greater and 10 μmol/g or less in alkali metal element equivalent.

The process for adjusting the content of the alkali metal element to fall within the above range is not particularly limited. Note that EVOH after subjecting to the saponification reaction usually contains the alkali metal element as a saponification catalyst residue. Thus, a process in which EVOH after subjecting to the saponification reaction using the aforementioned process is washed thereby removing the alkali metal element, and thereafter the alkali metal element is included in a given amount again to obtain an EVOH resin is preferred.

The process for including the alkali metal element in the EVOH resin may include: a process of immersing EVOH in a solution containing an alkali metal element; a process of melting the EVOH resin and mixing with a solution containing a compound including an alkali metal element, or an alkali metal element; a process of dissolving the EVOH resin in a suitable solvent and mixing with a compound including an alkali metal element; and the like.

In the case in which the EVOH resin is immersed in a solution containing an alkali metal element, the concentration of the alkali metal element in this solution is not particularly limited. Also, the solvent of the solution is not particularly limited, but is preferably an aqueous solution in light of the handleability and the like. The mass of the solution used for immersing the EVOH resin is usually at least three times, and preferably at least 10 times the mass of EVOH as dried. Although suitable range of the immersion time may vary depending on the form of the EVOH resin, it is usually 1 hour or longer, and preferably 2 hours or longer. The mode of the immersion in the solution is not particularly limited, and the immersion may be carried out after dividing into a plurality of aliquots, or the immersion may be carried out once. In light of simplification of the step, the immersion is preferably carried out once. A tower system apparatus may be suitably used to continuously carry out the immersion.

The EVOH resin of the present invention may also contain a carboxylic acid and/or a carboxylate ion. The content of the carboxylic acid and/or the carboxylate ion in the dry EVOH resin is preferably 0.05 μmol/g or greater and 25 μmol/g or less, more preferably 0.5 μmol/g or greater and 22 μmol/g or less, still more preferably 2 μmol/g or greater and 20 μmol/g or less, and particularly preferably 5 μmol/g or greater and 18 μmol/g or less. Examples of the carboxylic acid include succinic acid, adipic acid, benzoic acid, capric acid, lauric acid, stearic acid, glycolic acid, lactic acid, citric acid, tartaric acid, lactic acid, formic acid, acetic acid, propionic acid and the like. Of these, acetic acid, propionic acid and lactic acid are more preferred, and acetic acid and propionic acid are particularly preferred, in light of appropriate acidity, and ease in controlling the pH of the EVOH resin. Anions of these carboxylic acids are included in preferable carboxylate ions. When the content of the carboxylic acid and/or the carboxylate ion exceeds 25 μmol/g, thermal stability of the EVOH resin is deteriorated, and the resulting resin or molded article is likely to be accompanied by poor appearance such as coloring, fish-eye, streak and the like.

Moreover, the EVOH resin of the present invention preferably contains a phosphate compound in an amount of 1 to 500 ppm in phosphate equivalent. The type of the phosphate compound is not particularly limited, and any of various types of acids such as phosphoric acid and phosphorous acid, and salts thereof may be used. The phosphate may be any one of primary phosphate, secondary phosphate and tertiary phosphate, Also, the cation species is not particularly limited; however, it is preferably an alkali metal salt, or an alkaline earth metal salt. In particular, the phosphate compound is preferably included in the form of phosphoric acid, sodium dihydrogen phosphate, potassium dihydrogen phosphate, disodium hydrogen phosphate or dipotassium hydrogen phosphate, and adding the phosphate compound in the form of phosphoric acid, sodium dihydrogen phosphate or potassium dihydrogen phosphate is more preferred.

Furthermore, the upper limit of the content of the phosphate compound is preferably 400 ppm or less, and more preferably 300 ppm or less in phosphate equivalent. Also, the lower limit of the content of the phosphate compound is more preferably 3 ppm or greater, still more preferably 5 ppm or greater, and particularly preferably 10 ppm or greater.

In addition, the EVOH resin may contain a boron compound in the range not leading to impairment of the object of the present invention. Examples of the boron compound include boric acids such as orthoboric acid, metaboric acid, and tetraboric acid; boric acid esters, boric acid salts, hydrogenated boron compounds, and the like. Examples of the boric acid salt include borax, and alkali metal salts and alkaline earth metal salts of the aforementioned various types of boric acids, and the like. Among these compounds, orthoboric acid is preferred. When a boron compound is added, the content in terms of boron element is preferably in the range of 20 to 2,000 ppm, and more preferably in the range of 50 to 1,800 ppm.

As described in the foregoing, the EVOH resin obtained by the method for production of the present invention may contain at least one selected from the group consisting of a carboxylic acid, a phosphate compound and a boron compound as needed, and the process for including the same is not particularly limited. For example, a process that is similar to the process for including the aforementioned alkali metal element may be employed.

(Other Additives, Etc.)

To the EVOH resin obtained by the method for production of the present invention may be also added in addition to the aforementioned additives, an appropriate amount of a plasticizer, a stabilizer, an antioxidant, a surfactant, a pigment, a fluorescent whitening agent, an ultraviolet ray absorbing agent, a slip agent, an antistatic agent, a desiccating agent, a crosslinking agent, a metal salt other than alkali metal salts, a filler, a reinforcing agent such as various types of fiber, and the like in the range not leading to impairment of the effects of the present invention.

Furthermore, an appropriate amount of a thermoplastic resin other than EVOH may be also blended in the range not leading to impairment of the effects of the present invention. Examples of the thermoplastic resin which may be used include various types of polyolefins (polyethylene, polypropylene, poly 1-butene, poly 4-methyl-1-pentene, ethylene-propylene copolymers, copolymers of ethylene with α-olefin having 4 or more carbon atoms, copolymers of polyolefin and maleic anhydride, ethylene-vinyl ester copolymers, ethylene-acrylate copolymer, or modified polyolefins prepared by grafting modification of the same with an unsaturated carboxylic acid or a derivative thereof), various types of nylon (nylon-6, nylon-6,6, nylon-6/6,6 copolymer, etc.), polyvinyl chloride, polyvinylidene chloride, polyesters, polystyrene, polyacrylonitrile, polyurethane, polyacetal and modified polyvinyl alcohol resins, and the like.

Although the form of the EVOH resin of the present invention is not particularly limited, a solution form, a paste form, a powder form, a pellet form, a molded product form such as a film form is acceptable. The EVOH resin is preferably in a pellet form or a film form owing to easily executed irradiation with an infrared ray, easily achievable effect of preventing yellowing by way of the irradiation, and the like.

(Laminate)

The laminate of the present invention is a laminate provided with at least one layer obtained from the EVOH resin of the present invention. The layer structure of the laminate is not particularly limited; however, provided that: a layer obtained from the resin of the present invention is designated as E; a layer obtained from an adhesive resin is designated as Ad; and a layer obtained from a thermoplastic resin is designated as T, examples of the layer structure include T/E/T, E/Ad/T, T/Ad/E/Ad/T, and the like. Each layer of these may be either a monolayer, or a multilayer.

The method for producing the laminate is not particularly limited. For example, a method of melt extruding a thermoplastic resin onto a molded product obtained from the EVOH resin of the present invention (film, sheet. Etc.); a method of coextruding the EVOH resin of the present invention and other thermoplastic resin; a method of coinjecting the EVOH resin of the present invention with a thermoplastic resin; a method of laminating a molded article formed from the EVOH resin of the present invention and a film or a sheet of other base material using a well-known adhesive such as an organic titanium compound, an isocyanate compound or a polyester based compound; and the like may be exemplified.

Among these methods, a method of coextruding the EVOH resin of the present invention and other thermoplastic resin is preferably used. The EVOH resin of the present invention is superior in long-run workability and appearance characteristics, and in particular, coloring is less likely to occur even if melted at a comparatively high temperature. Therefore, even if the EVOH resin of the present invention and other thermoplastic resin having a comparatively high melting temperature are coextruded, a laminate being accompanied by suppressed occurrence of coloring such as yellowing, and being superior in the appearance can be obtained.

Examples of the thermoplastic resin used for other layer in the laminate include homopolymers of an olefin or copolymers thereof such as linear low density polyethylene, low density polyethylene, medium density polyethylene, high density polyethylene, ethylene-vinyl acetate copolymers, ethylene-propylene copolymers, polypropylene and propylene-α-olefin copolymers (α-olefin having 4 to 20 carbon atoms), polybutene, polypentene, polyesters such as polyethylene terephthalate, polyester elastomers, polyamides such as nylon-6 and nylon-6,6, polystyrene, polyvinyl chloride, polyvinylidene chloride, acrylic resins, vinyl ester based resins, polyurethane elastomers, polycarbonate, chlorinated polyethylene, chlorinated polypropylene, and the like. Of these, polypropylene, polyethylene, ethylene-propylene copolymers, ethylene-vinyl acetate copolymers, polyamides, polystyrene, polyesters are preferably used.

The aforementioned adhesive resin is not particularly limited as long as it has adhesiveness with the EVOH resin of the present invention and the thermoplastic resin, but adhesive resins containing a carboxylic acid modified polyolefin are preferred. As the carboxylic acid modified polyolefin, a carboxyl group-containing modified olefin-derived polymer can be suitably used which is obtained by allowing an ethylenic unsaturated carboxylic acid or an anhydride thereof to be chemically bonded (for example, addition reaction, graft reaction, etc.) to an olefin-derived polymer. In this regard, examples of the olefin-derived polymer include, e.g., polyolefins such as polyethylene (low pressure, middle pressure, high pressure), linear low density polyethylene, polypropylene and polybutene, copolymers (for example, ethylene-vinyl acetate copolymers, ethylene-ethyl acrylate copolymers, etc.) of olefin and other monomer (vinyl ester, unsaturated carboxylate ester, etc.). Among these, linear low density polyethylene, ethylene-vinyl acetate copolymers (content of vinyl acetate being 5% by mass or greater and 55% by mass or less) and ethylene-ethyl acrylate copolymers (content of ethyl acrylate being 8% by mass or greater and 35% by mass or less) are preferred, and linear low density polyethylene and ethylene-vinyl acetate copolymers are particularly preferred. As the ethylenic unsaturated carboxylic acid or an anhydride thereof, ethylenic unsaturated monocarboxylic acids, or esters thereof, ethylenic unsaturated dicarboxylic acids, or mono- or diesters thereof, or anhydrides of the same are exemplified, and of these, ethylenic unsaturated dicarboxylic acid anhydrides are preferred. Specifically, maleic acid, fumaric acid, itaconic acid, maleic anhydride, itaconic anhydride, maleic monomethyl ester, maleic monoethyl ester, maleic diethyl ester, fumaric monomethyl ester and the like are included, and particularly, maleic anhydride is suitable.

Although the process for coextrusion of the EVOH resin of the present invention and the thermoplastic resin, etc., is not particularly limited, a multimanifold-merging T die method, a feedblock-merging T die method, an inflation method, and the like may be exemplified.

By subjecting thus obtained coextrusion laminate to secondary processing, various types of molded products (films, sheets, tubes, bottles, etc.) can be obtained. The various types of molded products include, for example, articles as in the following:

(1) multilayer costretched sheets or films obtained by stretching a laminate (sheet or film, etc.) in an monoaxial or biaxial direction, followed by subjecting to a heat treatment;

(2) multilayer rolled sheets or films obtained by rolling a laminate (sheet or film, etc.);

(3) multilayer tray cup shaped containers obtained by subjecting a laminate (sheet or film, etc.) to a hot forming process such as vacuum forming, air-pressure forming or vacuum air-pressure forming; and (4) bottles, cup shaped containers and the like obtained by stretch blow molding or the like of a laminate (pipe, etc.).

Note that the secondary processing is not limited to each process illustrated for obtaining the molded product described above, and for example, any well-known secondary processing other than the aforementioned processes such as blow molding may be used ad libitum.

Since the laminate has a layer obtained from an EVOH resin having appearance characteristics (noncoloring properties) and sufficient long-run workability, it is accompanied by fewer fish-eye, gel and seed (dirt under paint) and less coloring such as yellowing and thus, for example, can be suitably used as a food container and the like such as a deep draw container, a cup shape container, and a bottle.

EXAMPLES

Hereinafter, the present invention will be explained in more detail by way of Example, but the present invention is not limited to these Examples.
(Quantitative Determination Method)

It should be noted that each quantitative determination in Examples herein was carried out according to the following method.

(1) Ethylene Content of EVOH

The ethylene content of an ethylene-vinyl alcohol copolymer was determined according to the analysis method described below by carrying out $^1$H-NMR measurement under the following measurement conditions.
Measurement Conditions
Name of apparatus: NMR spectrometer "Lambda 500" manufactured by JEOL Ltd.,
Observation frequency: 500 MHz
Solvent: DMSO-d6
Polymer concentration: 4% by mass
Measurement temperature: 80° C.
Cumulated number: 256 times
Analysis Method The ethylene content was calculated from the intensity ratio of: methylene protons of ethylene units, vinyl alcohol units and vinyl ester units (peak at 0.6 to 2.1 ppm), methine protons of vinyl alcohol units (peak at 3.15 to 4.15 ppm), and methine protons of vinyl ester units (peak at 1.95 to 2.00 ppm).

(2) Degree of Saponification

Dry EVOH pellet was ground by freeze grinding. Thus resulting ground EVOH was sieved with a sieve having a nominal dimension of 1 mm (according to normal sieve standard JIS-Z8801). EVOH powder passed through the sieve in an amount of 5 g was immersed in 100 g of ion exchanged water, and the mixture was stirred at 85° C. for 4 hours, followed by an operation of dewatering and drying repeated twice. Using thus obtained powder EVOH after washing, measurement of $^1$H-NMR was carried out under the following measurement conditions, and the degree of saponification was determined by the analysis method described below.

Measurement Conditions
Name of apparatus: NMR spectrometer "Lambda 500" manufactured by JEOL Ltd
Observation frequency: 500 MHz
Solvent: DMSO-d6
Polymer concentration: 4% by mass
Measurement temperature: 40° C. and 95° C.
Cumulated number: 600 times
Pulse delay time: 3.836 sec
Sample rotation speed: 10 to 12 Hz
Pulse width (90° pulse): 6.75 μsec
Analysis Method By the measurement at 40° C., a peak of hydrogen in water molecules was found at around 3.3 ppm, which overlapped with a peak in the range of 3.1 to 3.7 ppm among peaks of methine hydrogen of the vinyl alcohol units of EVOH. On the other hand, when measured at 95° C., the overlapping caused at 40° C. could be obviated; however, a peak of hydrogen of the hydroxyl groups of the vinyl alcohol units of EVOH was present at around 4 to 4.5 ppm, which overlapped with the range of 3.7 to 4 ppm of peaks of methine hydrogen of vinyl alcohol units of EVOH. Accordingly, for quantitative determination of methine hydrogen of vinyl alcohol units of EVOH (3.1 to 4 ppm), measurement data at 95° C. were employed with respect to the range of 3.1 to 3.7 ppm, and measurement data at 40° C. were employed with respect to the range of 3.7 to 4 ppm in order to avoid overlapping with peaks of hydrogen of water or hydroxyl groups. Thus, the total amount of the methine hydrogen was quantitatively determined in terms of the total value of these measurements. Note that the peak of hydrogen of water or hydroxyl group has been known to shift to a high magnetic field side by elevating the measurement temperature. Therefore, analyses were conducted as in the following using both measurement results at 40° C. and 95° C. From the spectrum obtained at 40° C. as described above, an integrated value ($I_1$) of the peak of the chemical shift at 3.7 to 4 ppm, and an integrated value ($I_2$) of the peak of the chemical shift at 0.6 to 1.8 ppm were determined. On the other hand, from the spectrum obtained at 95° C., an integrated value ($I_3$) of the peak of the chemical shift at 3.1 to 3.7 ppm, an integrated value ($I_4$) of the peak of the chemical shift at 0.6 to 1.8 ppm, and an integrated value ($I_5$) of the peak of the chemical shift at 1.9 to 2.1 ppm were determined. In this process, the peak of the chemical shift at 0.6 to 1.8 ppm principally derives from methylene hydrogen, whereas the peak of the chemical shift at 1.9 to 2.1 ppm derives from methyl hydrogen in unsaponified vinyl acetate units. From these integrated values, a degree of saponification was calculated according to the following formula (II).

$$\text{Degree of saponification(mol \%)} = \frac{(I_1/I_2 + I_3/I_4) \times 100}{(I_1/I_2 + I_3/I_4) + (I_5/I_4)/3} \tag{II}$$

(3) Melting Temperature of EVOH

The melting temperature of EVOH was determined by a differential scanning calorimetric analysis. More specifically, a differential scanning calorimetric analysis was performed on the pellet of the EVOH resin according to JIS-K7121 using a differential scanning calorimeter (DSC) model RDC220/SSC5200H (manufactured by Seiko Electronics Co., Ltd.) by elevating the temperature from 30° C. to 220° C. at a rate of 10° C./min, followed by quenching at a rate of 100° C./min to 30° C. and again elevating the temperature from 30° C. to 220° C. at a rate of 10° C./min. For calibration of the temperature, indium and lead were used. A peak melting temperature (Tpm) was determined from the second run chart as referred to in the JIS described above, and defined as the melting temperature.

(4) Water Content of EVOH Resin Pellet

Using a halogen moisture analyzer "HR73" manufactured by Mettler-Toledo International Inc., the water content of the EVOH pellet on dry basis was measured under conditions of a drying temperature of 180° C., a drying time of 20 min, and a sample amount of about 10 g.

(5) Quantitative Determination of Alkali Metal Ion

The dry EVOH pellet was crushed by freeze crushing. Thus obtained EVOH powder in an amount of 10 g and 50 mL of ion exchanged water were charged in a 100 mL stoppered Erlenmeyer flask equipped with a cooling condenser, and the mixture was stirred at 95° C. for 10 hours to execute heat extraction. Thus obtained extract in a volume of 2 mL was diluted with 8 mL of ion exchanged water. Thus diluted extract was subjected to a quantitative analysis using an ICP emission spectrophotometer "Optima 4300 DV" manufactured by PerkinElmer Japan Co., Ltd., at an observation wavelength of 589.592 nm, whereby the amount of sodium ion was quantitatively determined.

(6) Quantitative Determination of Phosphate Compounds

The dry EVOH pellet was crushed by freeze crushing. Thus obtained EVOH powder in an amount of 1.0 g, 15 mL of conc. nitric acid and 4 mL of conc. sulfuric acid were charged into a stoppered 100 mL Erlenmeyer flask equipped with a cooling condenser to execute heat degradation at 200 to 230° C. Thus obtained solution was diluted to 50 mL with ion exchanged water in a volumetric flask. The solution was subjected to a quantitative analysis using an ICP emission spectrophotometer "Optima 4300 DV" manufactured by PerkinElmer Japan Co., Ltd., at an observation wavelength of 214.914 nm, whereby the amount of phosphorus element was quantitatively determined, and the amount of phosphate compounds was calculated to give a value of phosphate equivalent.

(7) Quantitative Determination of Boron Compounds

A dry EVOH pellet provided as a sample in an amount of 50 mg was completely combusted by an oxygen flask combustion method, and thus resultant combusted ash deposition was dissolved in 10 mL of a 1 mol/L aqueous nitric acid solution. The solution was subjected to a quantitative analysis using an ICP emission spectrophotometer "Optima 4300 DV" manufactured by PerkinElmer Japan Co., Ltd., at an observation wavelength of 249.667 nm, whereby the content of boron compounds was obtained in a value of boron element equivalent.

(8) Intensity of the Infrared Ray

The intensity of the infrared ray was calculated by a measuring method illustrated in the foregoing embodiments.

(9) Resin Temperature in the Step of Irradiation with Infrared Ray

The temperature of the EVAc resin paste was measured with a thermometer in terms of the temperature of this paste. Also, the temperature of the EVOH resin was measured by a method illustrated in the foregoing embodiments.

Example 1-1

Production of Ethylene-Vinyl Acetate Copolymer

To a 250 L pressure reactor equipped with a stirrer, a nitrogen feed port, an ethylene feed port, an initiator addition port and a delay (consecutive addition) solution addition port were charged 83.0 kg of vinyl acetate and 26.6 kg of methanol, and the temperature was elevated to 60° C. Thereafter, the system was substituted with nitrogen by nitrogen bubbling for 30 min. Next, ethylene was charged such that the reactor pressure became 3.6 MPa. As an initiator a 2.5 g/L solution of 2,2'-azobis(4-methoxy-2,4-dimethylvaleronitrile) (AMV) dissolved in methanol was prepared, and the solution was substituted with nitrogen by bubbling nitrogen gas. After the internal temperature of the polymerization bath was adjusted to 60° C., 362 mL of the initiator solution was injected to initiate polymerization. During the polymerization, ethylene was introduced to maintain the reactor pressure of 3.6 MPa and the polymerization temperature of 60° C., and the initiation solution was continuously added at 1119.5 mL/hour using the aforementioned initiator solution to perform polymerization. 5.0 hours later, the polymerization was stopped by cooling when the rate of polymerization reached 40%. After the reactor was opened to remove ethylene, nitrogen gas was bubbled to completely eliminate ethylene. Next, the copolymer solution was continuously supplied through an upper part of a tower filled with Raschig ring, and methanol was blown through a lower part of the tower. Mixed vapor of methanol and unreacted vinyl acetate monomer was allowed to outflow through the top of the tower, whereby unreacted vinyl acetate monomer was removed through the bottom of the tower to give a methanol solution of an ethylene-vinyl acetate copolymer (EVAc).

(Saponification)

To thus obtained EVAc solution was added methanol to adjust a concentration of 15% by mass. To 253.4 kg of thus prepared methanol solution of EVAc (38 kg of EVAc in the solution) was added 76.5 L of an alkali solution (20% by mass NaOH solution in methanol, molar ratio (MR) relative to vinyl acetate units in EVAc: 0.4) and the mixture was stirred at 60° C. for 4 hours to carry out saponification of EVAc. After 6 hours from starting the reaction, the reaction liquid was neutralized by adding 11.0 kg of acetic acid and 60 L of water to terminate the reaction.

(Washing)

The neutralized reaction liquid was transferred from the reactor to a metal drum, and left to stand at room temperature for 16 hours, thereby permitting cooling and hardening to give a paste form. Thereafter, liquid was removed from the resin in the paste form using a centrifugal separator ("H-130" manufactured by Kokusan Centrifuge Co., Ltd., number of revolution: 1,200 rpm). Next, a step of washing the resin with water was conducted for 10 hours in which washing was carried out while continuously supplying ion exchanged water to the central portion of the centrifugal separator from above. The conductivity of the washing liquid after 10 hours from starting washing was 30 μS/cm (measured with "CM-30ET" manufactured by TOA Electronics Ltd.).

(Coagulation and Pelletization)

EVOH in the paste form obtained in this manner was dried using a dryer at 60° C. for 48 hours to give EVOH in the form of powder. Thus dried EVOH in the form of powder in an amount of 20 kg was dissolved in 43 L of a water/methanol mixed solvent (mass ratio: water/methanol=4/6) while stirring at 80° C. for 12 hours. Next, the stirring was stopped, and the temperature of the dissolving vessel was lowered to 65° C. By leaving to stand for 5 hours, degassing of the water/methanol solution of EVOH was carried out. Then, the EVOH was extruded from a die plate provided with a circular opening having a diameter of 3.5 mm into a water/methanol mixed solution (mass ratio: water/methanol=9/1) at 5° C. to allow for coagulation to give a strand form, and cut to obtain a EVOH pellet having a diameter of about 4 mm and a length of about 5 mm.

(Washing)

Thus obtained EVOH pellet in an amount of 40 kg and 150 L of ion exchanged water were placed in a metal drum having a height of 900 mm and an opening diameter of 600 mm. An operation of washing at 25° C. for 2 hours while stirring, and eliminating the liquid was repeated twice. Next, 150 L of 1 g/L aqueous acetic acid solution was added to 30 kg of the EVOH pellet, and an operation of washing at 25° C. for 2 hours while stirring, and eliminating the liquid was repeated twice. Furthermore, 150 L of ion exchanged water was added to 30 kg of the EVOH pellet, and an operation of washing at 25° C. for 2 hours while stirring, and eliminating the liquid was repeated six times. The conductivity of the washing liquid after carrying out the sixth washing was measured with "CM-30ET" manufactured by TOA Electronics Ltd., and as a result, the washing liquid was revealed to have a conductivity of 3 µS/cm. Thus resulting EVOH pellet had a water content of 110% by mass.

(Preparation of Each Component and Drying)

Subsequently, 3.0 kg of the EVOH pellet was charged into 30 L of an aqueous solution for acid treatment prepared by blending 0.80 g/L acetic acid as a carboxylic acid, 0.50 g/L sodium acetate as an alkali metal salt, 0.015 g/L phosphoric acid as a phosphate compound, and 0.2 g/L boric acid as a boron compound in water at each blend rate. Immersion and stirring of the mixture were then allowed at 25° C. for about 5 hours. The pellet after the treatment was dried at 80° C. for 3 hours, and subsequently at 120° C. for 24 hours to obtain an EVOH pellet.

(EVOH Pellet)

EVOH in the EVOH pellet after drying had an ethylene content of 32 mol %, and a degree of saponification of 99.98 mol % or greater. Also, the content of carboxylic acid and carboxylate ion in the EVOH pellet was 16.7 µmol/g; the content of alkali metal ion was 7.39 µmol/g; the content of phosphate compounds was 10 ppm in phosphate equivalent; and the content of boron compounds was 890 ppm in a value of boron element equivalent. This EVOH pellet had a water content of 0.3% by mass. Also, the EVOH pellet had MFR (melt flow rate: 210° C.; load: 2,160 g) of 3.6 g/10 min.

(Irradiation with Infrared Ray)

The EVOH pellet was placed into a cylindrical vessel. The EVOH pellet was irradiated with an infrared ray from above the vessel using an Infrared Moisture Balance "MB-30" manufactured by CBC Co., Ltd. for 1 hour, to obtain an EVOH pellet, in which coloring such as yellowing was prevented, as an EVOH resin of Example 1. The temperature of the EVOH pellet that is a resin temperature during the irradiation with an infrared ray was from 130° C. to 150° C.

Examples 1-2 to 1-7

EVOH pellets of Examples 1-2 to 1-7 were obtained in a similar manner to Example 1-1 except that the resin temperature of the EVOH pellet during the irradiation and the intensity of the irradiation with an infrared ray were as shown in Table 1.

Examples 1-8 to 1-11

EVOH pellets of Examples 1-8 to 1-11 were obtained in a similar manner to Example 1-1 except that the resin temperature of the EVOH pellet during the irradiation with an infrared ray, and irradiation time of the infrared ray were as shown in Table 1.

Example 1-12

The EVOH pellet after drying at 80° C. for 3 hours in Example 1-1 was removed and as a result of measurement, the water content thereof was 10% by mass. Irradiation of the EVOH pellet with an infrared ray was carried out by a similar method to Example 1-1. Subsequently, an EVOH pellet was obtained by drying with a similar method to Example 1-1 at 120° C. for 24 hours.

Examples 1-13 to 1-15

The EVOH pellet having a water content of 110% by mass before the preparation of each component in Example 1-1 was irradiated with an infrared ray for each irradiation time changed as shown in Table 1. Subsequently, EVOH pellets were obtained by preparing each component and drying according to a similar method to Example 1-1.

Example 1-16

The EVOH pellet obtained by a similar method to Example 1 before the irradiation with an infrared ray was subjected to monolayer film casting under the following conditions using a 20 mm Extruder "D2020" (D (mm)=20, L/D=20, compression ratio=2.0, screw: full flight) manufactured by Toyo Seiki Seisaku-sho, Ltd. to obtain an EVOH monolayer film.

Extrusion temperature: feeding zone/compression zone/metering zone/die=180/210/220/220° C.

Number of revolution of screw: 80 rpm

Output rate: 1.0 kg/hour

Chill roll temperature: 80° C.

Winding speed: 3.1 m/min.

Film thickness: 50 µm

Subsequently, the EVOH film was irradiated with an infrared ray with an apparatus similar to Example 1-1 for 1 hour to obtain an EVOH film, in which coloring such as yellowing was prevented, as an EVOH resin of Example 1-16. The temperature of the EVOH film during irradiation with an infrared ray was from 130° C. to 150° C.

Example 1-17

A paste composed of a methanol solution of the ethylene-vinyl acetate copolymer in Example 1-1 was irradiated with an infrared ray for 1 hour in a similar manner to Example 1-1. The temperature of the EVOH paste that is a resin temperature during irradiation with an infrared ray was from 60° C. to 80° C. Subsequently, as an EVOH resin of Example 1-17 an EVOH pellet enabling prevention of coloring such as yellowing was obtained by subjecting the EVOH paste to similar steps (excluding the step of irradiation with an infrared ray) to Example 1-1.

Examples 1-18 to 1-19

EVOH pellets of Examples 1-18 and 1-19 were obtained in a similar manner to Example 1-1 except that ethylene contents of the EVOH were as shown in Table 1.

Comparative Example 1-1

An EVOH pellet of Comparative Example 1-1 was obtained in a similar manner to Example 1-1 except that the EVOH pellet was not irradiated with an infrared ray.

Comparative Example 1-2

An EVOH pellet of Comparative Example 1-2 was obtained in a similar manner to Example 1-1 except that hot air at 150° C. was blown in place of irradiating the EVOH pellet with an infrared ray.

Comparative Example 1-3

An EVOH pellet of Comparative Example 1-3 was obtained in a similar manner to Example 1-1 except that the EVOH pellet was irradiated with an ultraviolet ray in place of irradiating with an infrared ray.

TABLE 1

| | Ethylene content (mol %) | Degree of saponification (mol %) | Form | Water content % by mass*1 | Melting temperature °C. | Light or heat | wavelength*2 nm |
|---|---|---|---|---|---|---|---|
| Example 1-1 | 32 | 99.98 or greater | pellet | 0.3 | 183 | Infrared ray | 1,100 |
| Example 1-2 | 32 | 99.98 or greater | pellet | 0.3 | 183 | Infrared ray | 1,100 |
| Example 1-3 | 32 | 99.98 or greater | pellet | 0.3 | 183 | Infrared ray | 1,100 |
| Example 1-4 | 32 | 99.98 or greater | pellet | 0.3 | 183 | Infrared ray | 1,100 |
| Example 1-5 | 32 | 99.98 or greater | pellet | 0.3 | 183 | Infrared ray | 1,100 |
| Example 1-6 | 32 | 99.98 or greater | pellet | 0.3 | 183 | Infrared ray | 1,100 |
| Example 1-7 | 32 | 99.98 or greater | pellet | 0.3 | 183 | Infrared ray | 1,100 |
| Example 1-8 | 32 | 99.98 or greater | pellet | 0.3 | 183 | Infrared ray | 1,100 |
| Example 1-9 | 32 | 99.98 or greater | pellet | 0.3 | 183 | Infrared ray | 1,100 |
| Example 1-10 | 32 | 99.98 or greater | pellet | 0.3 | 183 | Infrared ray | 1,100 |
| Example 1-11 | 32 | 99.98 or greater | pellet | 0.3 | 183 | Infrared ray | 1,100 |
| Example 1-12 | 32 | 99.98 or greater | pellet | 10 | 183 | Infrared ray | 1,100 |
| Example 1-13 | 32 | 99.98 or greater | pellet | 110 | 183 | Infrared ray | 1,100 |
| Example 1-14 | 32 | 99.98 or greater | pellet | 110 | 183 | Infrared ray | 1,100 |
| Example 1-15 | 32 | 99.98 or greater | pellet | 110 | 183 | Infrared ray | 1,100 |
| Example 1-16 | 32 | 99.98 or greater | film | 0.05 | 183 | Infrared ray | 1,100 |
| Example 1-17 | 32 | — | paste | — | 183 | Infrared ray | 1,100 |
| Example 1-18 | 27 | 99.98 or greater | pellet | 0.3 | 191 | Infrared ray | 1,100 |
| Example 1-19 | 48 | 99.98 or greater | pellet | 0.3 | 160 | Infrared ray | 1,100 |
| Comparative Example 1-1 | 32 | 99.98 or greater | pellet | 0.3 | 183 | — | — |
| Comparative Example 1-2 | 32 | 99.98 or greater | pellet | 0.3 | 183 | Heat | — |
| Comparative Example 1-3 | 32 | 99.98 or greater | pellet | 0.3 | 183 | Ultraviolet ray | 365 |

| | Intensity W/m³ (×10³) | Temperature °C. | Irradiation or heating time hour | ⊿YI | Appearance characteristics (Coloring properties) | Long-run workability (Viscosity stability) |
|---|---|---|---|---|---|---|
| Example 1-1 | 330 | 130 to 150 | 1 | 5 | A | A |
| Example 1-2 | 384 | 145 to 160 | 1 | 4 | A | A |
| Example 1-3 | 362 | 140 to 160 | 1 | 4 | A | A |
| Example 1-4 | 296 | 105 to 125 | 1 | 4 | A | A |
| Example 1-5 | 272 | 85 to 110 | 1 | 3 | A | A |
| Example 1-6 | 241 | 85 to 105 | 1 | 3 | A | A |
| Example 1-7 | 241 | 75 to 95 | 1 | 3 | A | A |
| Example 1-8 | 330 | 70 to 80 | 0.1 | 1 | B | A |
| Example 1-9 | 330 | 130 to 150 | 0.5 | 3 | A | A |
| Example 1-10 | 330 | 130 to 150 | 3 | 4 | A | A |
| Example 1-11 | 330 | 130 to 150 | 5 | 3 | A | A |
| Example 1-12 | 330 | 130 to 150 | 1 | 4 | A | A |
| Example 1-13 | 330 | 130 to 150 | 1 | 4 | A | A |
| Example 1-14 | 330 | 130 to 150 | 5 | 7 | A | A |
| Example 1-15 | 330 | 130 to 150 | 10 | 6 | A | B |
| Example 1-16 | 330 | 130 to 150 | 1 | 2 | B | A |
| Example 1-17 | 1,390 | 60 to 80 | 1 | — | A | A |
| Example 1-18 | 330 | 130 to 150 | 1 | — | B | A |

TABLE 1-continued

| | | | | | | |
|---|---|---|---|---|---|---|
| Example 1-19 | 330 | 130 to 150 | 1 | 2 | B | A |
| Comparative Example 1-1 | — | — | — | 0 | B | A |
| Comparative Example 1-2 | — | 130 to 150 | 2 | −16 | C | C |
| Comparative Example 1-3 | 28 | 20 | 1 | 0 | B | A |

*[1]value derived by dividing the mass of water included in the pellet or film by the dry mass of the resin included in the pellet or film.
*[2]to be the dominant wavelength emitted from the light source.

<Evaluation of EVOH Resin>

Evaluations of the EVOH resins of Examples 1-1 to 1-19 and Comparative Examples 1-1 to 1-3 obtained as described above were performed as in the following. The results of evaluation are shown in Table 1.

(Evaluation Method)

(1) ΔYI (change in the degree of coloring (yellowing) between before and after the light or heat treatment)

YI (yellow index) values of the EVOH pellet or the EVOH film before and after subjecting to the light or heat treatment were measured using "LabScan XE Sensor" manufactured by HunterLab, and the ΔYI value was calculated according to the following formula (III). It should be noted that the YI value is a marker representing the yellowness index (yellowishness) of an object. More specifically, a higher YI value suggests a greater yellowness index (yellowishness), whereas a smaller YI value suggests a lower yellowness index (yellowishness) indicating being less colored. Also, a higher ΔYI value indicates that prevention of coloring such as yellowing by a light or heat treatment is more significantly enabled.

$$\Delta YI = (YI \text{ value before the treatment}) - (YI \text{ value after the treatment}) \quad (III)$$

(2) Appearance Characteristics (Degree of Coloring (Yellowing) After Light Irradiation)

The degree of coloring of the EVOH pellet or the EVOH film produced by the aforementioned method was determined by visual inspection as in the following.

Evaluation: Criteria
  A: being favorable;
  B: being less yellowish; and
  C: being yellowish (3) Long-Run Workability (Viscosity Stability)

Change in torque when 60 g of the obtained EVOH pellet was kneaded in a Laboplast Mill (manufactured by Toyo Seiki Seisaku-sho, Ltd. "20R200"; biaxial, counter rotating type) at 100 rpm and 260° C. was measured. The torque was measured after 5 min from the beginning of kneading, and a time period was determined which was required until the torque value reached 1.5 times the aforementioned torque value after 5 min from the beginning. This time period being longer indicates less change in the viscosity, and more superior long-run workability.

Evaluation: Criteria
  A: 60 min or longer;
  B: 40 min or longer and shorter than 60 min; and
  C: 20 min or longer and shorter than 40 min As is seen from the results shown in Table 1, it is revealed that an EVOH resin enabling prevention of yellowing, and having sufficient long-run workability can be obtained according to the method for production of Examples 1-1 to 1-19.

Example 2-1

Step (I): Pelletization

EVOH having an ethylene content of 38 mol %, a degree of saponification of 100 mol % and a water content of 53% by mass was charged into a biaxial extruder TEX44α manufactured by Japan Steel Works, Ltd., and then EVOH was discharged from a liquid addition port of discharge opening tip portion while an aqueous solution containing acetic acid, boric acid, sodium acetate and phosphoric acid (with respect to 1,000 parts by mass of EVOH, the amount of added components being acetic acid: 7 parts by mass; boric acid: 15 parts by mass; sodium acetate: 700 parts by mass; and phosphoric acid: 0.5 parts by mass) was added. The extruder was equipped with a slit for dehydration, and thus the EVOH pellet was discharged while eliminating water and water vapor. The output rate of EVOH on a dry mass unit was 20 kg per hour. The resultant EVOH pellet (granular solid matter) was spherical with a diameter 3.0 mm, and had a water content of 21% by mass. Specifications of the biaxial extruder employed is as shown below.

Screw Diameter: 44 mmφ
Screw: fully intermeshing type in the same direction
Screw rotation speed: 220 rpm
Heater: segmented type into 13 portions, with a preset temperature of 100 to 120° C.
Dehydration opening: provided at three points
Liquid addition port: provided at one point
Cutting system: center hot cutter; with two blades; 2,800 rpm
Die: 8 holes, 3 mmφ; preset temperature: 130° C.

Step (II): Irradiation with an Infrared Ray (Dry)

The thus resulting EVOH pellet in an amount of 1.0 kg was charged into a horizontal circular cylindrical drum (internal diameter: 400 mm; and width: 500 mm), and a halogen lamp manufactured by TOKO, INC., (rated apparent power: 1.0 kW; irradiation wavelength: 1.5 μm; lamp width: 600 mm) was inserted into the drum. The EVOH pellet was irradiated with an infrared ray by the halogen lamp while agitating the EVOH pellet by rotating the drum. The infrared ray was irradiated with a setting of the irradiation distance between the halogen lamp and the EVOH pellet being 150 mm. The rotation frequency of the drum was adjusted to 20 rpm (driven by inverter reducer CNHM01 manufactured by Sumitomo Heavy Industries, Ltd.). In addition, the temperature of the EVOH pellet was measured with a radiation temperature sensor (manufactured by Keyence Corporation, FT-H30) connected to a digital controller (manufactured by TOHO Electronics Inc., TTM-204), and the output of the halogen lamp was controlled by switching such that the temperature of the EVOH pellet became 130° C. to 131° C. The atmospheric temperature in the drum during drying was 47° C. Three hours after starting the irradiation, the irradiation with the infrared ray was stopped. As a result of measurement, the resultant dry EVOH pellet (resin) had a water content of 0.17% by mass.

<Evaluation of EVOH Resin>

Evaluations of the EVOH resin obtained as described above (dry EVOH pellet) were performed as in the following.

(Evaluation Method)

(1) Percentage of Bubbling

The obtained dry EVOH pellet in an amount of 100 g was sorted by the naked eye, and the percentage of bubbling (percentage of the pellet in which shape defects such as recession, air inclusion and bubbling are found) of the pellet was determined. The percentage of bubbling was 1% by mass.

(2) Transparency

The obtained dry EVOH pellet in an amount of 100 g was placed in a circular cylindrical glass bottle having an internal diameter of 50 mm, and the transparency of the pellet was visually observed to make an evaluation as follows.

Evaluation: Criteria

A: the pellet being transparent, no opacity found;

B: the pellet being transparent, but opaque pellet found in part;

C: loss of transparency of the pellet found, and being clouded like a frosted glass; and D: the pellet being completely opacified, with the transparency lost.

As a result of the evaluation, the transparency of the obtained dry EVOH pellet was evaluated to be "B".

The obtained dry EVOH pellet was subjected to a test of monolayer film casting shown below, whereby the coloring resistance and the appearance characteristics were evaluated.

[Test of Monolayer Film Casting]

A monolayer film was obtained from the dry EVOH pellet using a 20 mm short-screw extruder manufactured by Toyo Seiki Seisaku-sho, Ltd. by carrying out monolayer film casting under the following conditions.

Extrusion temperature: 220° C.
Number of revolution of screw: 40 rpm
Output rate: 1.2 kg/hour
Chill roll temperature: 80° C.
Winding speed: 2.0 m/min.
Film thickness: 30 μm (3) Coloring Resistance The monolayer film produced by the method described above was rolled up around a paper tube and the degree of coloring on the edge of the film roll was evaluated visually as in the following.

Evaluation: Criteria

A: no coloring;
B: somewhat yellowing;
C: yellowing; and
D: intensely yellowing.

(4) Appearance Characteristics

The monolayer film produced by the method described above was visually observed on fish-eye and streak, and the appearance of the film was evaluated as in the following.

Evaluation: Criteria

A: good appearance, with fish-eye and streak being almost absent;

B: not bad appearance, with fish-eye and streak being somewhat noticeable;

C: fish-eye and streak being noticeable, with somewhat bad appearance; and

D: fish-eye and streak being marked, with unfavorable transparency of the film.

As a result of the evaluation, the coloring resistance of the obtained monolayer film was evaluated to be "A". In addition, the appearance characteristics of the monolayer film was evaluated to be "A".

Example 2-2

Step (I)

An EVOH pellet having a water content of 21% by mass was obtained according to the method of Example 2-1, and thereafter preliminarily dried in a hot-air dryer (manufactured by Advantec Toyo Kaisha, Ltd., FA-620) preset at 110° C. for 3 hours. The water content of the EVOH pellet after the preliminary drying was 3.2% by mass.

Step (II)

In a similar manner to Example 2-1 except that the resin temperature of the EVOH pellet was controlled to be 125° C. to 126° C., the EVOH pellet was obtained and after the preliminary drying, an infrared ray was irradiated. During drying, the atmospheric temperature in the drum was 45° C. Two hours after starting the irradiation, the irradiation with the infrared ray was stopped. As a result of measurement, the water content of the obtained dry EVOH pellet was 0.20% by mass.

As a result of evaluation on the percentage of bubbling and the transparency of the dry EVOH pellet according to the method of Example 2-1, the percentage of bubbling was 0% by mass, and the transparency was evaluated to be "A".

As a result of the test of monolayer film casting and the evaluation carried out according to the method of Example 2-1, the coloring resistance was evaluated to be "A", and the appearance characteristic was evaluated to be "A".

Example 2-3

After the step (I) was carried out similarly to Example 2-1, the dry EVOH pellet was obtained in a similar manner to Example 2-1 except that the drum was heated by a heat transfer heater to adjust the atmospheric temperature in the drum to be 110° C. in the step (II). After irradiation with the infrared ray for 3 hours, the obtained dry EVOH pellet had a water content of 0.31% by mass.

As a result of evaluation on the percentage of bubbling and the transparency of the dry EVOH pellet according to the method of Example 2-1, the percentage of bubbling was 5% by mass, and the transparency was evaluated to be "B".

As a result of the test of monolayer film casting and the evaluation carried out according to the method of Example 2-1, the coloring resistance was evaluated to be "B", and the appearance characteristic was evaluated to be "B".

Example 2-4

In a similar manner to Example 2-1 except that the resin temperature was controlled to be 80° C. to 81° C. in the step (II), the EVOH pellet was irradiated with an infrared ray. During drying, the atmospheric temperature was 33° C. After irradiation with the infrared ray for 5 hours, the EVOH pellet had a water content of 5.3% by mass, indicating a state of insufficient drying. Furthermore, drying of the EVOH pellet was continued, and 50 hours after starting the irradiation with an infrared ray, the obtained dry EVOH pellet had a water content of 0.24% by mass.

As a result of evaluation on the percentage of bubbling and the transparency of the dry EVOH pellet according to the method of Example 2-1, the percentage of bubbling was 0% by mass, and the transparency was evaluated to be "A".

As a result of the test of monolayer film casting and the evaluation carried out according to the method of Example 2-1, the coloring resistance was evaluated to be "A", and the appearance characteristic was evaluated to be "B".

Example 2-5

In a similar manner to Example 2-1 except that the resin temperature was controlled to be 150° C. to 151° C. in the step (II), the EVOH pellet was irradiated with an infrared ray. During drying, the atmospheric temperature was 53° C. After irradiation with the infrared ray for 3 hours, the dry EVOH pellet had a water content of 0.09% by mass.

As a result of evaluation on the percentage of bubbling and the transparency of the dry EVOH pellet according to the method of Example 2-1, the percentage of bubbling was 53% by mass, and the transparency was evaluated to be "C".

As a result of the test of monolayer film casting and the evaluation carried out according to the method of Example 2-1, the coloring resistance was evaluated to be "A", and the appearance characteristic was evaluated to be "B".

Example 2-6

Step (I)

A mixed solution in water and methanol of EVOH having an ethylene content of 27 mol % and a degree of saponification of 100 mol % (EVOH concentration: 27% by mass; and mass ratio of water/methanol=5/5) was extruded from a metal plate provided with circular openings having a diameter of 3.5 mm into a mixed solution of water and methanol (mass ratio of water/methanol=9/1) at 5° C. Thus, coagulation to give a strand form was allowed. The deposit having a strand form was cut to give circular cylindrical pellets having a diameter of about 4 mm and a length of about 5 mm.

The thus resulting EVOH pellet in an amount of 5.0 kg was introduced into a tower type vessel, and washed for 10 hours by feeding pure water (10 L per hour) from the bottom of the tower. Subsequently, washing was carried out for 6 hours by feeding in place of pure water, a treatment water containing 0.7 g/L acetic acid, 0.2 g/L boric acid, 0.4 g/L sodium acetate and 0.03 g/L phosphoric acid. The obtained EVOH pellet had a water content of 183% by mass.

Step (II)

The thus resulting EVOH pellet in an amount of 1.5 kg was irradiated with an infrared ray using a facility similar to that of Example 2-1, and the output of the halogen lamp was controlled by switching such that the temperature of the EVOH pellet became 130° C. to 131° C. During drying, the atmospheric temperature was 45° C. Eight hours after starting the irradiation, the irradiation with the infrared ray was stopped. As a result of measurement, the dry EVOH pellet had a water content of 0.17% by mass.

As a result of evaluation on the percentage of bubbling and the transparency of the dry EVOH pellet according to the method of Example 2-1, the percentage of bubbling was 71% by mass, and the transparency was evaluated to be "C".

As a result of the test of monolayer film casting and the evaluation carried out according to the method of Example 2-1, the coloring resistance was evaluated to be "A", and the appearance characteristic was evaluated to be "A".

Example 2-7

Step (I)

Similar operation to that of Example 2-5 was performed until the EVOH pellet was washed, which was then preliminary dried subsequently in a hot-air dryer preset at 100° C. for 5 hours. the water content of the EVOH pellet after the preliminary drying was 3.8% by mass.

Step (II)

In a similar manner to Example 2-5 except that the resin temperature of the EVOH pellet was controlled to be 125° C. to 126° C., an infrared ray was irradiated. During drying, the atmospheric temperature was 44° C. Two hours after starting the irradiation, the irradiation with the infrared ray was stopped. As a result of measurement, the water content of the obtained dry EVOH pellet was 0.27% by mass.

As a result of evaluation on the percentage of bubbling and the transparency of the dry EVOH pellet according to the method of Example 2-1, the percentage of bubbling was 0% by mass, and the transparency was evaluated to be "A".

As a result of the test of monolayer film casting and the evaluation carried out according to the method of Example 2-1, the coloring resistance was evaluated to be "A", and the appearance characteristic was evaluated to be "A".

Comparative Example 2-1

EVOH pellet having an ethylene content of 38 mol %, a degree of saponification of 100 mol % and a water content of 21% by mass 1.0 kg, which was obtained similarly to the step (I) of Example 2-1 was charged into a hot-air dryer (manufactured by Advantec Toyo Kaisha, Ltd., FA-620), and dried at a preset temperature of 134° C. in the hot-air dryer. During drying, the resin temperature of the EVOH pellet was measured using a digital thermometer (manufactured by AS ONE Corporation, TM-300), revealing a stable temperature within the range of 130 to 131° C. Three hours after starting drying, the EVOH pellet was removed, and the water content measured was 0.65% by mass, indicating insufficient drying of EVOH. Furthermore, the drying was continued, and 6 hours after starting drying, the dry EVOH pellet had a water content of 0.15% by mass.

As a result of evaluation on the percentage of bubbling and the transparency of the dry EVOH pellet according to the method of Example 2-1, the percentage of bubbling was 12% by mass, and the transparency was evaluated to be "B".

As a result of the test of monolayer film casting and the evaluation carried out according to the method of Example 2-1, the coloring resistance was evaluated to be "C", and the appearance characteristic was evaluated to be "B".

Comparative Example 2-2

EVOH pellet having an ethylene content of 38 mol %, a degree of saponification of 100 mol % and a water content of 3.2% by mass 1.0 kg, which was obtained similarly to the step (I) of Example 2-2 was charged into a hot-air dryer (manufactured by Advantec Toyo Kaisha, Ltd., FA-620), and dried at a preset temperature of 129° C. in the hot-air dryer. During drying, the temperature of the EVOH pellet was measured using a digital thermometer (manufactured by AS ONE Corporation, TM-300), revealing a stable temperature within the range of 125 to 126° C. Three hours after starting drying, the EVOH pellet was removed, and the water content measured was 0.75% by mass, indicating insufficient drying of the EVOH pellet. Furthermore, the drying was continued, and 9 hours after starting drying, the dry EVOH pellet had a water content of 0.22% by mass.

As a result of evaluation on the percentage of bubbling and the transparency of the dry EVOH pellet according to the method of Example 2-1, the percentage of bubbling was 0% by mass, and the transparency was evaluated to be "A".

As a result of the test of monolayer film casting and the evaluation carried out according to the method of Example 2-1, the coloring resistance was evaluated to be "B", and the appearance characteristic was evaluated to be "A".

Comparative Example 2-3

EVOH pellet having an ethylene content of 27 mol %, a degree of saponification of 100 mol % and a water content of 183% by mass 1.0 kg, which was obtained similarly to the step (I) of Example 2-6 was charged into a hot-air dryer (manufactured by Advantec Toyo Kaisha, Ltd., FA-620), and dried at a preset temperature of 134° C. in the hot-air dryer. During drying, the temperature of the EVOH pellet was measured using a digital thermometer (manufactured by AS ONE Corporation, TM-300), revealing a stable temperature within the range of 130 to 131° C. Eight hours after starting drying, the EVOH pellet was removed, and the water content measured was 1.8% by mass, indicating insufficient drying. Furthermore, the drying was continued, and 10 hours after starting drying, the obtained dry EVOH pellet had a water content of 0.34% by mass.

As a result of evaluation on the percentage of bubbling and the transparency of the dry EVOH pellet according to the method of Example 2-1, the percentage of bubbling was 82% by mass, and the transparency was evaluated to be "C".

As a result of the test of monolayer film casting and the evaluation carried out according to the method of Example 2-1, the coloring resistance was evaluated to be "C", and the appearance characteristic was evaluated to be "C".

Comparative Example 2-4

EVOH pellet having an ethylene content of 27 mol %, a degree of saponification of 100 mol % and a water content of 183% by mass 1.0 kg, which was obtained similarly to the step (I) of Example 2-6 was charged into a hot-air dryer (manufactured by Advantec Toyo Kaisha, Ltd., FA-620), and dried at a preset temperature of 134° C. in the hot-air dryer. During drying, the temperature of the EVOH pellet was measured using a digital thermometer (manufactured by AS ONE Corporation, TM-300), revealing a stable temperature within the range of 130 to 131° C. Eight hours after starting drying, the EVOH pellet was removed, and the water content measured was 1.8% by mass. The EVOH pellet in the course of drying in an amount of 0.5 kg was placed into a tray made of Teflon (registered trademark), and irradiated with a microwave at an output of 500 W. Although the output of the microwave was adjusted so as to adjust the resin temperature to be 130 to 131° C., the resin temperature varied within the rang of 110° C. to 156° C. During drying, the atmospheric temperature was 45° C. One hour later, the irradiation with the microwave was stopped, and the water content of the EVOH pellet measured was 0.09%. In the obtained dry EVOH pellet, agglutination of pellet particles with one another was found in part.

As a result of evaluation on the percentage of bubbling and the transparency of the dry EVOH pellet according to the method of Example 2-1, the percentage of bubbling was 93% by mass, and the transparency was evaluated to be "D".

As a result of the test of monolayer film casting and the evaluation carried out according to the method of Example 2-1, the coloring resistance was evaluated to be "B", and the appearance characteristic was evaluated to be "B".

Drying conditions, etc., in the foregoing Examples and Comparative Examples and results of evaluation are again shown in Table 2.

TABLE 2

|  | Ethylene content of EVOH (mol %) | Water content before step (II) (% by mass) | Atmospheric temperature in step (II) (° C.) | Resin temperature in step (II) (° C.) | Drying time period in step (II) (hour) | Water content after step (II) (% by mass) | Percentage of bubbling (% by mass) | Transparency — | Coloring resistance — | Appearance characteristics — |
|---|---|---|---|---|---|---|---|---|---|---|
| Example 2-1 | 38 | 21 | 47 | 130-131 | 3 | 0.17 | 1 | B | A | A |
| Example 2-2 | 38 | 3.2 | 45 | 125-126 | 2 | 0.20 | 0 | A | A | A |
| Example 2-3 | 38 | 21 | 110 | 130-131 | 3 | 0.31 | 5 | B | B | B |
| Example 2-4 | 38 | 21 | 33 | 80-81 | 50 | 0.24 | 0 | A | A | B |
| Example 2-5 | 38 | 21 | 53 | 150-151 | 3 | 0.09 | 53 | C | A | B |
| Example 2-6 | 27 | 183 | 45 | 130-131 | 8 | 0.17 | 71 | C | A | A |
| Example 2-7 | 27 | 3.8 | 44 | 125-126 | 2 | 0.27 | 0 | A | A | A |
| Comparative Example 2-1* | 38 | 21 | 134 | 130-131 | 6 | 0.15 | 12 | B | C | B |
| Comparative Example 2-2* | 38 | 3.2 | 129 | 125-126 | 9 | 0.22 | 0 | A | B | A |
| Comparative Example 2-3* | 27 | 183 | 134 | 130-131 | 10 | 0.34 | 82 | C | C | C |
| Comparative Example 2-4* | 27 | 1.8 | 35 | 110-156 | 1 | 0.09 | 93 | D | B | B |

*Drying was carried out in place of the step (II), using a hot-air dryer in Comparative Examples 2-1 to 2-3, and using irradiation with a microwave in Comparative Example 2-4.

As shown in Table 2 above, according to the method for production of Examples 2-1 to 2-7, dry EVOH pellets (EVOH resins) that are excellent in efficiency of drying, and has superior appearances can be obtained.

INDUSTRIAL APPLICABILITY

The EVOH resin of the present invention enables coloring such as yellowing to be prevented, etc.; therefore, it can be suitably used as a material for various types of molded products, monolayer or multilayer films, sheets, pipes, containers and fibers that are superior in appearance characteristics.

EXPLANATION OF THE REFERENCE SYMBOLS 1 drying device
2 rotary drum
3 infrared ray lamp 3a ray exit surface
4 motor
5 belt
6 shaft
A granular matter

The invention claimed is:

1. A method for producing an ethylene-vinyl alcohol copolymer resin, the method comprising irradiating solid matter comprising an ethylene-vinyl alcohol copolymer and water with an infrared ray;
wherein the solid matter irradiated is in granular form or fiber form, and is dried by the irradiation.

2. The method according to claim 1, wherein the irradiation occurs with an infrared ray lamp.

3. The method according to claim 1, wherein the wavelength of the infrared ray in the irradiation is 700 nm or greater and 1,000,000 nm or less.

4. The method according to claim 1, wherein the intensity of the infrared ray in the irradiation is $30 \times 10^3$ W/m³ or greater and $3,000 \times 10^3$ W/m³ or less.

5. The method according to claim 1, wherein the irradiation time in the irradiation is 0.1 hours or longer and 20 hours or shorter.

6. The method according to claim 1, further comprising saponifying an ethylene-vinyl ester copolymer to obtain the ethylene-vinyl alcohol copolymer.

7. The method according to claim 6, wherein the temperature of the ethylene-vinyl alcohol copolymer resin in the irradiation is the glass transition temperature or greater and the melting temperature or less of the ethylene-vinyl alcohol copolymer.

8. The method according to claim 6, further comprising pelletizing a solution or paste comprising the ethylene-vinyl alcohol copolymer obtained by the saponification, to obtain a pellet comprising the ethylene-vinyl alcohol copolymer, wherein the irradiation occurs after the pelletization.

9. The method according to claim 8, further comprising drying the pellet to give a water content of 0.01% by mass or greater and less than 10% by mass, wherein the irradiation occurs simultaneously with or after separate, non-irradiation drying.

10. The method according to claim 9, wherein the pellet has a water content before irradiating of 0.01% by mass or greater and less than 10% by mass.

11. The method according to claim 1, wherein an atmospheric temperature in the irradiating is 10° C. or greater and 100° C. or less.

12. The method according to claim 1, wherein the water content of the solid matter subjected to the irradiation is 0.5% by mass or greater and 200% by mass or less.

13. The method according to claim 1, wherein the water content of the solid matter after the irradiation is less than 0.5% by mass.

14. The method according to claim 1, wherein the solid matter is granular, and the infrared ray is irradiated while agitating the solid matter.

15. The method according to claim 1, wherein the solid matter is granular, and the infrared ray is irradiated while conveying the solid matter on a conveyor.

16. The method according to claim 1, wherein said solid matter consists of said ethylene-vinyl alcohol copolymer and water.

17. The method according to claim 16, wherein said solid matter is in fiber form.

* * * * *